US012688413B2

(12) United States Patent
Sahin et al.

(10) Patent No.: US 12,688,413 B2
(45) Date of Patent: Jul. 21, 2026

(54) METHODS FOR RELIABLE OVER-THE-AIR COMPUTATION WITH PULSES FOR DISTRIBUTED LEARNING AND WITH FEDERATED EDGE LEARNING WITHOUT CHANNEL STATE INFORMATION

(71) Applicant: UNIVERSITY OF SOUTH CAROLINA, Columbia, SC (US)

(72) Inventors: Alphan Sahin, Columbia, SC (US);
Bryson Everette, Columbia, SC (US);
Safi Shams Muhtasimu Hoque, West Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 1077 days.

(21) Appl. No.: 17/837,757

(22) Filed: Jun. 10, 2022

(65) Prior Publication Data

US 2022/0405589 A1    Dec. 22, 2022

Related U.S. Application Data

(60) Provisional application No. 63/210,323, filed on Jun. 14, 2021, provisional application No. 63/210,344, filed on Jun. 14, 2021.

(51) Int. Cl.
| | |
|---|---|
| *G06N 3/08* | (2023.01) |
| *G06N 3/048* | (2023.01) |
| *H04L 27/26* | (2006.01) |

(52) U.S. Cl.
CPC ............... *G06N 3/08* (2013.01); *G06N 3/048* (2023.01); *H04L 27/2621* (2013.01)

(58) Field of Classification Search
CPC . G06N 3/098; H04L 27/2634; H04L 27/2636; H04L 27/26526; H04L 27/2666; H04L 27/3845; H04L 25/4902
See application file for complete search history.

(56) References Cited

U.S. PATENT DOCUMENTS 9,419,838 B1 *   8/2016   Wentzloff ......... H04L 27/26362

OTHER PUBLICATIONS

Zhu et al. (One-Bit Over-the-Air Aggregation for Communication-Efficient Federated Edge Learning: Design and Convergence Analysis, IEEE, published Mar. 3, 2021, pp. 2120-2135). (Year: 2021).*

(Continued)

*Primary Examiner* — Tan H Tran
(74) *Attorney, Agent, or Firm* — DORITY & MANNING, P.A.

(57) ABSTRACT

An over-the-air computation (AirComp) scheme is proposed for federated edge learning (FEEL) without channel state information (CSI) at the edge devices (EDs) or edge server (ES). The proposed scheme adopts the majority vote (MV) principle and uses pulse-position modulation (PPM) symbols constructed with discrete Fourier transform (DFT)-spread orthogonal frequency division multiplexing (OFDM) (DFT-s-OFDM) as votes from EDs. By taking the delay spread and synchronization errors into account, we show how to eliminate the need for truncated-channel inversion (TCI) at the EDs and detect MV at the ED with a non-coherent detector. The proposed method naturally reduces the peak-to-mean envelope power ratio (PMEPR) of the signal as it inherits the properties of the single-carrier (SC) waveform. An alternative proposed scheme also adopts the majority vote (MV) principle but further defines multiple subcarriers and orthogonal frequency division multiplexing (OFDM) symbols for voting options, which reduces to frequency-shift keying (FSK) over OFDM subcarriers as a special case. Since the votes from EDs are separated on orthogonal resources, the proposed scheme eliminates the need for truncated-channel inversion (TCI) at the EDs and allows the ES to detect MV with a non-coherent detector. We also mitigate the peak-to-mean envelope power ratio (PMEPR) of the synthesized signals by using randomization symbols. Through simulations, we show that the proposed (Continued)

schemes provide high test accuracy in fading channels for both independent and identically distributed (IID) and non-IID data while resulting in lower PMEPR symbols as compared to one-bit broadband digital aggregation (OBDA) with quadrature amplitude modulation (QAM).

36 Claims, 22 Drawing Sheets

(56)                    References Cited

OTHER PUBLICATIONS

Wu et al. (Optimized DFT-spread OFDM based visible light communications with multiple lighting sources, Optics Express, published 2017, pp. 1-15). (Year: 2017).*
Zhang et al. (Synchronization and Integration Region Optimization for UWB Signals with Non-coherent Detection and Auto-correlation Detection, IEEE, published 2008, pp. 1-9). (Year: 2008).*
Huang et al. (Low PMEPR OFDM Radar Waveform Design Using the Iterative Least Squares Algorithm, IEEE, published Jun. 24, 2015, pp. 1975-1979). (Year: 2015).*
Troglia et al. (FaIR: Federated Incumbent Detection in CBRS Band, IEEE, published Dec. 19, 2019, pp. 1-6). (Year: 2019).*
Xiao et al. (Rectangular Differential OFDM with Index Modulation, IEEE, published 2019, pp. 1-6). (Year: 2019).*
Co-Pending U.S. Appl. No. 17/728,119, filed Apr. 25, 2022.
Amiri et al., Collaborative Machine Learning at the Wireless Edge with Blind Transmitters, 2019 IEEE Global Conference on Signal and Information Processing (GlobalSIP), Ottawa Canada, 2019, pp. 1-5. (Abstract Only) https://ieeexplore.ieee.org/document/8969185.
Amiri et al., Federated Learning over Wireless Fading Channels, IEEE Transactions on Wireless Communications, vol. 19, Issue 5, 2020, pp. 3546-3557. https://arxiv.org/pdf/1907.09769.pdf.
Bernstein et al., signSGD: Compressed Optimisation for Non-Convex Problems, Proceedings of the 35th International Conference on Machine Learning, PMLR 80, 2018, pp. 560-569. http://proceedings.mlr.press/v80/bernstein18a/bernstein18a.pdf.
Chen et al., Distributed Learning in Wireless Networks: Recent Progress and Future Challenges, ARVIX, 2021, 23 Pages. https://arxiv.org/pdf/2104.02151.pdf.
Dahlman et al., 5G NR: The Next Generation Wireless Access Technology, Book, Academic Press, 2020. https://books.google.com/books?hl=en& lr=&id=-bfjDwAAQBAJ&oi=fnd&pg =PP1&dq= 5G+NR:+The+Next+Generation+Wireless+Access+Technology&ots= 5LkvBSNW7r&sig=2gNP4qU7UxdOXnaBNeB0kotYV2g#v=onepage &q=5G%20NR%3A%20The%20Next%20Generation%20Wireless% 20Access%20Technology&f=false.
Gafni et al., Federated Learning: A Signal Processing Perspective, ARXIV, Electrical Engineering and Systems Science, Signal Processing, 2021, 24 Pages. https://arxiv.org/pdf/2103.17150.pdf.
Goldenbaum et al., Harnessing Interference for Analog Function Computation in Wireless Sensor Networks, IEEE Transactions on Signal Process, vol. 61, Issue 20, Oct. 15, 2013, pp. 4893-4906. (Abstract Only) https://ieeexplore.ieee.org/abstract/document/6557530.
Hellstrom et al., Wireless for Machine Learning: A Survey, Foundations and Trends in Signal Processing, V3, Jun. 2022, 113 Pages. https://arxiv.org/abs/2008.13492.
Jawhar et al., A Review of Partial Transmit Sequence for PAPR Reduction in the OFDM Systems, IEEE Access, vol. 7, 2019, pp. 18021-18041. https://ieeexplore.ieee.org/document/8637941 https:// www.researchgate.net/publication/343244103_Federated_Learning_ in_the_Sky_Joint_Power_Allocation_and_Scheduling_with_UAV_ Swarms.
Kakkavas et al., On PAPR Characteristics of DFT-s-OFDM with Geometric and Probabilistic Constellation Shaping, 2017 IEEE 18th International Workshop on Signal Processing Advances in Wireless Communications (SPAWC), 2017, 5 Pages. https://doi.org/10.1109/ SPAWC.2017.8227810.
Liu et al., Over-the-Air Computation Systems: Optimization, Analysis and Scaling Laws, IEEE Transactions on Wireless Communications, vol. 19, Issue 8, Aug. 2020, pp. 5488-5502. (Abstract Only) https://ieeexplore.ieee.org/document/9095231.
Nazer et al., Computation Over Multiple-Access Channels, IEEE Transactions on Information Theory, vol. 53, Issue 10, Oct. 2007, pp. 3498-3516. (Abstract Only) https://ieeexplore.ieee.org/document/ 4305404.
Sahin et al., Flexible DFT-S-OFDM: Solutions and Challenges, IEEE Communications Magazine, vol. 54, Issue 11, 2016, 106-112. (Abstract Only) https://doi.org/10.1109/MCOM.2016.1600330CM.
Sahin et al., Over-the-Air Computation with DFT-Spread OFDM for Federated Edge Learning, 2022 IEEE Wireless Communications and Networking Conference (WCNC), Austin TX, 2022, pp. 1886-1891. https://arxiv.org/pdf/2112.13439.pdf.
Sery et al. Over-the-Air Federated Learning from Heterogeneous Data, IEEE Transactions on Signal Processing, ARXIV, Oct. 2020, 15 Pages. https://arxiv.org/pdf/2009.12787.pdf.
Yang et al., Federated Learning via Over-the-Air Computation, IEEE Transactions on Wireless Communications, vol. 19, Issue 3, 2020, pp. 2022-2035. https://ieeexplore.ieee.org/document/ 8952884.
Zeng et al., Federated Learning in the Sky: Joint Power Allocation and Scheduling with UAV Swarms, IEEE International Conference on Communications (ICC), 2020, pp. 1-6. https://www.reseachgate. net/publication/343244103_Federated_Learning_in_the_Sky_Joint_ Power_Allocation_and_Scheduling_with_UAV_Swarms/citation/ download.
Zhu et al., Broadband Analog Aggregation for Low-Latency Federated Edge Learning, IEEE Transactions on Wireless Communications, vol. 19, Issue 1, Jan. 2020, pp. 491-506. (Abstract Only) https://ieeexplore.ieee.org/document/8870236.
Zhu et al., One-Bit Over-the-Air Aggregation for Communication-Efficient Federated Edge Learning: Design and Convergence Analysis, IEEE Transactions on Wireless Communications, vol. 20, Issue 3, Mar. 2021, pp. 2120-2135. (Abstract Only) https://ieeexplore. ieee.org/document/9272666.

* cited by examiner

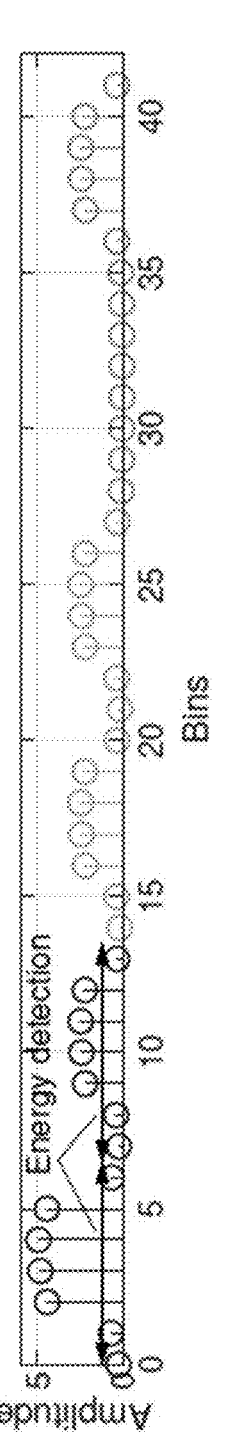
FIG. 2(g)
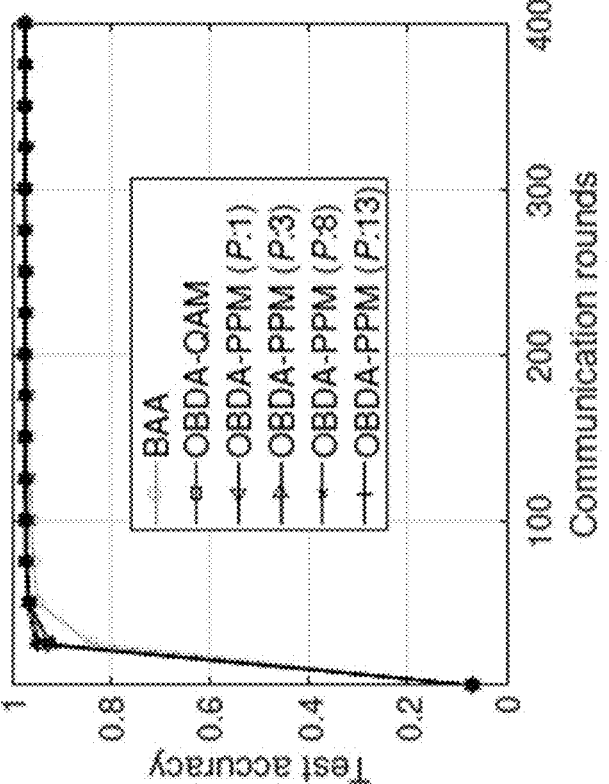
FIG. 3(b)
FIG. 3(a)

METHODS FOR RELIABLE OVER-THE-AIR COMPUTATION WITH PULSES FOR DISTRIBUTED LEARNING AND WITH FEDERATED EDGE LEARNING WITHOUT CHANNEL STATE INFORMATION

PRIORITY CLAIMS

The present application claims the benefit of priority of U.S. Provisional Patent Application No. 63/210,323, titled Methods for Reliable Over-The-Air Computation with Pulses for Distributed Learning, filed Jun. 14, 2021, and of U.S. Provisional Patent Application No. 63/210,344, titled Methods for Reliable Over-The-Air Computation and Federated Edge Learning, filed Jun. 14, 2021, both of which are fully incorporated herein by reference for all purposes.

BACKGROUND OF THE PRESENTLY DISCLOSED SUBJECT MATTER

Federated edge learning (FEEL) is an implementation of federated learning (FL) over a wireless network to train a model by using the local data at the edge devices (EDs) without uploading them to an edge server (ES)[1],[2]. Within each iteration of FEEL, the initial model parameters are first distributed to many EDs for an edge server (ES). The EDs then share their local updates, e.g., updated model parameters or local gradients, based on local data with the ES. After the local updates are aggregated at the ES, the global updates are distributed back to the EDs for the next iteration. Since a large number of parameters needs to be transmitted from the EDs to the ES for each iteration, the communication aspect of FEEL stands as one of the main bottlenecks.

One of the promising solutions to this issue is to perform the aggregation by utilizing the signal-superposition property of a wireless multiple access channel[3]-[5], i.e., over-the-air computation (AirComp). However, an AirComp scheme often requires channel state information (CSI) at either the EDs or ES to maintain coherent superposition of the signals from EDs, which can cause a non-negligible overhead and unreliable aggregation in a mobile wireless network. In this disclosure, we address this issue with a new AirComp method. Also, developing a broadband AirComp scheme is not trivial due to the multipath channel and often channel state information (CSI) needs to be available at the EDs or ES. In this disclosure, we also address this issue with a novel scheme.

In the literature, FEEL is investigated with several notable AirComp schemes. The transmission of the local model parameters at the EDs over orthogonal frequency division multiplexing (OFDM) subcarriers are proposed to achieve model parameter aggregation in prior art[6]. In other words, the local model parameters at the EDs are transmitted over orthogonal frequency division multiplexing (OFDM) subcarriers to achieve broadband analog aggregation (BAA) of the model parameters over the air. To reverse the effect of the multipath channel on the transmitted signals, truncated-channel inversion (TCI) is applied, where the symbols on the OFDM subcarriers are multiplied with the inverse of the channel coefficients and the subcarriers that fade are excluded from the transmissions. Further, one-bit broadband digital aggregation (OBDA)[7], inspired by signSGD[8], is proposed to facilitate the implementation of FEEL. In this method, the EDs transmit quadrature amplitude modulation (QAM) symbols over OFDM subcarriers with TCI, where the signs of the elements, i.e., votes, of the local gradient vectors to create the real and imaginary parts of the QAM symbols. At the ES, the signs of the real and imaginary components of the superposed symbols on each subcarrier are used to estimate the global gradients based on the majority vote (MV) principle.

Despite the fact that OBDA is compatible with digital modulations, for AirComp, each ED still requires CSI for TCI as in broadband analog aggregation (BAA). An additional time-varying precoder is applied along with TCI for BAA to facilitate the aggregation[13]. EDs sparsify their gradient estimates and project the resultant sparse vector into a low-dimensional vector for bandwidth reduction[14]. The compressed data is transmitted with BAA. In other studies, the CSI is not available at the EDs, i.e., blind EDs[9]-[10]. However, it is assumed that CSI between each ED and ES is available at the ES. It is shown that beamforming with a large number of antennas can reduce the impact of the channel on the aggregation. To the best of our knowledge, there is no AirComp scheme in the documented literature where CSI is unavailable to both the EDs and the ES for FEEL.

Presently disclosed subject matter considers the MV principle and proposes an AirComp scheme for FEEL based on gradient averaging, using pulse-position modulation (PPM) and creating separate pulses for the available voting options. In other present disclosure, instead of encoding the votes with QAM symbols, we use multiple subcarriers and/or OFDM symbols for voting options, which corresponds to frequency-shift keying (FSK) over OFDM subcarriers as a special case.

SUMMARY OF THE PRESENTLY DISCLOSED SUBJECT MATTER

I. Introduction

Aspects and advantages of the presently disclosed subject matter will be set forth in part in the following description, or may be apparent from the description, or may be learned through practice of the presently disclosed subject matter.

Broadly speaking, the presently disclosed subject matter relates to methods for reliable over-the-air computation and federated edge learning.

The presently disclosed systems/devices and the corresponding and/or associated methodologies relate to over-the-air computation (AirComp) scheme(s) for federated edge learning (FEEL) in some instances without channel state information (CSI) at the edge devices (EDs) or edge server (ES). The proposed schemes adopt the majority vote (MV) principle.

The present disclosure proposes an over-the-air computation (AirComp) scheme for federated edge learning (FEEL) without channel state information (CSI) at the edge devices (EDs) or edge server (ES). The proposed scheme adopts the majority vote (MV) principle and uses pulse-position modulation (PPM) symbols constructed with discrete Fourier transform (DFT)-spread orthogonal frequency division multiplexing (OFDM) (DFT-s-OFDM) as votes from EDs. By taking the delay spread and synchronization errors into account, we show how to eliminate the need for truncated-channel inversion (TCI) at the EDs and to detect MV at the ED with a non-coherent detector. The proposed method naturally reduces the peak-to-mean envelope power ratio (PMEPR) of the signal as it inherits the properties of the single-carrier (SC) waveform. Per another embodiment, the proposed scheme adopts the majority vote (MV) principle and further defines multiple subcarriers and orthogonal frequency division multiplexing (OFDM) symbols for voting options, which reduces to frequency-shift keying (FSK) over OFDM subcarriers as a special case. Since the votes from EDs are separated on orthogonal resources, it eliminates the need for truncated-channel inversion (TCI) at the EDs and allows the ES to detect MV with a non-coherent detector. Since the proposed method does not encode the votes on amplitude and phase, it also admits peak-to-mean envelope power ratio (PMEPR) reduction techniques.

Per the foregoing, the presently disclosed subject matter fully encompasses both first and second aspects as discussed hereinbelow.

Through simulations, we show that the proposed schemes provide high test accuracy in fading channels for both independent and identically distributed (IID) and non-IID data while resulting in lower PMEPR symbols as compared to one-bit broadband digital aggregation (OBDA) with quadrature amplitude modulation (QAM).

Federated edge learning (FEEL) is an implementation of federated learning (FL) over a wireless network to train a model by using the local data at the edge devices (EDs) without uploading them to an edge server (ES)[1], [2]. Within each iteration of FEEL, a substantial number of parameters (e.g., model parameters or model updates) from each ED needs to be transmitted to the ES for aggregation. Thus, the communication aspect of FEEL is one of the major bottlenecks. One of the promising solutions to this issue is to perform the aggregation by utilizing the signal-superposition property of a wireless multiple access channel[3]-[5], i.e., over-the-air computation (AirComp). However, an AirComp scheme often requires channel state information (CSI) at either the EDs or ES to maintain coherent superposition of the signals from EDs, which can cause a non-negligible overhead and unreliable aggregation in a mobile wireless network. In this work, we address this issue with a new AirComp method. Further, developing a broadband Air-Comp scheme is not trivial due to the multipath channel and often channel state information (CSI) needs to be available. In this disclosure, we address this issue with a novel AirComp scheme.

This disclosure addresses the communication latency problem of training an artificial intelligence model over a wireless network. It reduces the latency with over-the-air computation when there are many users. The disclosure does not use the channel information (e.g., channel frequency response) needed for wireless communications at the edge devices (e.g., a user) or edge server (e.g., a base station).

This disclosure will most likely be a case for 5G New Radio and beyond, or 6G. In the literature, broadband analog aggregation (BAA) and one-bit digital aggregation (OBDA) are two major methods that reduce latency. However, they require channel state information at the edge devices (this is a non-negligible or substantial overhead).

An applicable market for the presently disclosed subject matter is large as it is related to both commercial wireless and AI technologies. It could be useful for artificial intelligence technologies over wireless or sensor networks, 5G and beyond, 6G wireless standardization, IEEE 802.11 Wi-Fi.

From competitive advantage perspectives: 1) The proposed schemes do not need a channel inversion at the EDs. From this aspect, it is compatible with time-varying channels or mobile networks including drones, cars, or satellites; 2) It does not lose the gradient information due to the truncation; 3) The proposed scheme reduces PMEPR as it uses pulses or uses a simple randomization technique; 4) It also does not require CSIs at the ES or multiple antennas for over-the-air computation; and 5) The PMEPR can be adjusted based on the resources in time, i.e., offer flexibility.

The presently disclosed subject matter relates in various aspects to distributed learning, federated edge learning, pulse-position modulation, orthogonal frequency division multiplexing, DFT-s-OFDM, SC-FDE, over-the-air computation, peak-to-mean envelope power ratio (PMEPR), orthogonal frequency division multiplexing (OFDM), and frequency-shift keying (FSK) subject matters.

In this disclosure, we consider the MV principle and propose an AirComp scheme for FEEL based on gradient averaging. We use pulse-position modulation (PPM) and create separate pulses for the available voting options, where the pulses are synthesized with discrete Fourier transform (DFT)-spread OFDM (DFT-s-OFDM) used in Long-Term Evolution (LTE) and New Radio (NR) uplink[11] As the proposed scheme encodes information with the position of pulses, CSI is not needed, eliminating the need for TCI at the EDs and enabling the ES to determine MV with a non-coherent detector. We also discuss the design with the consideration of the delay spread and the synchronization errors in the time domain.

In another present disclosure, instead of encoding the votes with QAM symbols, we use multiple subcarriers and/or OFDM symbols for voting options, which corresponds to frequency-shift keying (FSK) over OFDM subcarriers as a special case. As the votes are aggregated on orthogonal resources with the proposed scheme, we eliminate the need for TCI at the EDs and enable the ES to determine the MV with a non-coherent detector. The proposed scheme can be used with well-known peak-to-mean envelope power ratio (PMEPR) reduction techniques as it does not utilize the amplitude and the phase to encode votes. We reduce PMEPR by using randomization symbols on active subcarriers, which also speed up the convergence for non-independent and identically distributed (IID) data.

Notation: As used herein, the sets of complex numbers and real numbers are denoted by C and R, respectively. $E_t[\cdot]$ is the expectation of its argument over t. The signum function is denoted by $\text{sign}(\cdot)$ and results in 1, −1, or 0 for a positive, a negative, or a zero-valued argument. We use the notation $$(a)_i^j$$

as shorthand for denoting a vector $[a_i, a_{j+1}, \ldots, a_j]^T$. The N-dimensional all zero and one vectors are $0_N$ and $I_N$, respectively.

Other example aspects of the present disclosure are directed to systems, apparatus, tangible, non-transitory computer-readable media, user interfaces, memory devices, and electronic smart devices or the like. To implement methodology and technology and/or apparatus herewith, one or more processors may be provided, programmed to perform the steps and functions as called for by the presently disclosed subject matter, as will be understood by those of ordinary skill in the art.

One presently disclosed exemplary methodology preferably relates to an over-the-air computation (AirComp) methodology for federated edge learning (FEEL) without using channel state information (CSI) at a plurality of edge devices (EDs) or at an edge server (ES). Such methodology preferably comprises a distributed machine-learning model to be trained with the update vectors received at an edge server (ES) as transmitted from a plurality of edge devices (EDs);

one or more processors; and one or more non-transitory computer-readable media that store instructions that, when executed by the one or more processors, cause the one or more processors to perform operations. Such operations preferably comprise transmitting local update vectors as votes from each respective of the plurality of edge devices (EDs) via a wireless multiple access channel, receiving the superposed local updates at the ES, determining the majority vote (MV) for each element of the update vector at the ES with an energy detector over orthogonal time and frequency resources, and inputting the MVs into the machine-learning model to be updated. Further preferably, the votes comprise (1) pulse-position modulation (PPM) symbols constructed with discrete Fourier transform (DFT)-spread orthogonal frequency division multiplexing (OFDM) (DFT-s-OFDM) or (2) frequency-shift keying (FSK) symbols constructed with orthogonal frequency division multiplexing (OFDM) for voting options.

It is to be understood from the complete disclosure herewith that the presently disclosed subject matter equally relates to both apparatus and corresponding and related methodology.

One presently disclosed exemplary embodiment relates to a system for an over-the-air computation (AirComp) system for federated edge learning (FEEL) without using channel state information (CSI) at a plurality of edge devices (EDs) or at an edge server (ES). Such system preferably comprises a machine-learning model training to process data received at an edge server (ES) as transmitted from a plurality of edge devices (EDs); one or more processors; and one or more non-transitory computer-readable media that store instructions that, when executed by the one or more processors, cause the one or more processors to perform operations. Such operations preferably comprise transmitting local updates as votes over selected multiple subcarriers from each respective of the plurality of edge devices (EDs) via a wireless multiple access channel, receiving the local updates at the ES, aggregating the local updates at the ES including separating votes from the EDs using orthogonal resources and majority vote (MV) principle, and inputting the obtained data into the machine-learning model as training data or data to process. Preferably, such votes comprise pulse-position modulation (PPM) symbols constructed with discrete Fourier transform (DFT)-spread orthogonal frequency division multiplexing (OFDM) (DFT-s-OFDM).

Yet another presently disclosed exemplary embodiment relates an over-the-air computation (AirComp) system for federated edge learning (FEEL) without using channel state information (CSI) at a plurality of edge devices (EDs) or at an edge server (ES). Such system preferably comprises a machine-learning model training to process data received at an edge server (ES) as transmitted from a plurality of edge devices (EDs); one or more processors; and one or more non-transitory computer-readable media that store instructions that, when executed by the one or more processors, cause the one or more processors to perform operations. Such operations preferably comprise transmitting local updates as votes over multiple orthogonal subcarriers from each respective of the plurality of edge devices (EDs) via a wireless multiple access channel, receiving the local updates at the ES, aggregating the local updates at the ES including separating votes from the EDs using orthogonal resources and majority vote (MV) principle, and inputting the obtained data into the machine-learning model as training data or data to process. Preferably, the votes comprise frequency-shift keying (FSK) symbols constructed with orthogonal frequency division multiplexing (OFDM) for voting options.

Additional objects and advantages of the presently disclosed subject matter are set forth in, or will be apparent to, those of ordinary skill in the art from the detailed description herein. Also, it should be further appreciated that modifications and variations to the specifically illustrated, referred, and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which:

FIG. 1 is a schematic illustration of an exemplary presently disclosed embodiment (first aspect) of federated edge learning (FEEL);

FIGS. 2(a)-2(g) graphically illustrate a first aspect herewith example of Majority Vote (MV) with one-bit broadband digital aggregation (OBDA) with pulse-position modulation (PPM) (OBDA-PPM) based on discrete Fourier transform (DFT)-spread orthogonal frequency division multiplexing (OFDM) (DFT-s-OFDM) with K=3 edge devices (EDs) (Mpulse=4; Mgap=3; Mvote=3; M=42; N=2048);

FIG. 2(a) specifically graphically illustrates ED1's votes;

FIG. 2(b) specifically graphically illustrates ED2's votes;

FIG. 2(c) specifically graphically illustrates ED3's votes;

FIG. 2(d) specifically graphically illustrates ED1's signal (where a pulse is a combination of Dirichlet sinc functions);

FIG. 2(e) specifically graphically illustrates ED1's signal including time dispersion and synchronization error;

FIG. 2(f) specifically graphically illustrates ED1's vote at the edge server (ES) location;

FIG. 2(g) specifically graphically illustrates aggregated votes over the air and the energy detection at the ES;

FIGS. 3(a)-3(h) graphically show first aspect herewith test accuracy results for IID data, where the FEEL with the OBDA-PPM works without the CSI at the EDs and ES;

FIG. 3(*a*) specifically graphically illustrates for IID data additive white Gaussian noise (AWGN), SNR is 0 dB, D=400, K=50;

FIG. 3(*b*) specifically graphically illustrates for IID data AWGN, SNR is 20 dB, D=400, K=50;

FIG. 3(*c*) specifically graphically illustrates for IID data AWGN, SNR is 0 dB, D=2000, K=10;

FIG. 3(*d*) specifically graphically illustrates for IID data AWGN, SNR is 20 dB, D=2000, K=10;

FIG. 3(*e*) specifically graphically illustrates for IID data Fading channel, SNR is 0 dB (D=400, K=50);

FIG. 3(*f*) specifically graphically illustrates for IID data Fading channel, SNR is 20 dB (D=400, K=50);

FIG. 3(*g*) specifically graphically illustrates for IID data Fading channel, SNR is 0 dB (D=2000, K=10);

FIG. 3(*h*) specifically graphically illustrates for IID data Fading channel, SNR is 20 dB (D=2000, K=10);

FIG. 4(*a*) specifically graphically illustrates for non-IID data additive white Gaussian noise (AWGN), SNR is 0 dB, D=400, K=50;

FIG. 4(*b*) specifically graphically illustrates for non-IID data AWGN, SNR is 20 dB, D=400, K=50;

FIG. 4(*c*) specifically graphically illustrates for non-IID data AWGN, SNR is 0 dB, D=2000, K=10;

FIG. 4(*d*) specifically graphically illustrates for non-IID data AWGN, SNR is 20 dB, D=2000, K=10;

FIG. 4(*e*) specifically graphically illustrates for non-IID data Fading channel, SNR is 0 dB (D=400, K=50);

FIG. 4(*f*) specifically graphically illustrates for non-IID data Fading channel, SNR is 20 dB (D=400, K=50);

FIG. 4(*g*) specifically graphically illustrates for non-IID data Fading channel, SNR is 0 dB (D=2000, K=10);

FIG. 4(*h*) specifically graphically illustrates for non-IID data Fading channel, SNR is 20 dB (D=2000, K=10);

FIG. 9(*a*) specifically graphically illustrates for IID data additive white Gaussian noise (AWGN), SNR is 0 dB, D=400, K=50;

FIG. 9(*b*) specifically graphically illustrates for IID data AWGN, SNR is 20 dB, D=400, K=50;

FIG. 9(*c*) specifically graphically illustrates for IID data AWGN, SNR is 0 dB, D=2000, K=10;

FIG. 9(*d*) specifically graphically illustrates for IID data AWGN, SNR is 20 dB, D=2000, K=10;

FIG. 9(*e*) specifically graphically illustrates for IID data Fading channel, SNR is 0 dB (D=400, K=50);

FIG. 9(*f*) specifically graphically illustrates for IID data Fading channel, SNR is 20 dB (D=400, K=50);

FIG. 9(*g*) specifically graphically illustrates for IID data Fading channel, SNR is 0 dB (D=2000, K=10);

FIG. 9(*h*) specifically graphically illustrates for IID data Fading channel, SNR is 20 dB (D=2000, K=10);

FIG. 10(*a*) specifically graphically illustrates for non-IID data additive white Gaussian noise (AWGN), SNR is 0 dB, D=400, K=50;

FIG. 10(*b*) specifically graphically illustrates for non-IID data AWGN, SNR is 20 dB, D=400, K=50;

FIG. 10(*c*) specifically graphically illustrates for non-IID data AWGN, SNR is 0 dB, D=2000, K=10;

FIG. 10(*d*) specifically graphically illustrates for non-IID data AWGN, SNR is 20 dB, D=2000, K=10;

FIG. 10(*e*) specifically graphically illustrates for non-IID data Fading channel, SNR is 0 dB (D=400, K=50);

FIG. 10(*f*) specifically graphically illustrates for non-IID data Fading channel, SNR is 20 dB (D=400, K=50);

FIG. 10(*g*) specifically graphically illustrates for non-IID data Fading channel, SNR is 0 dB (D=2000, K=10);

FIG. 10(*h*) specifically graphically illustrates for non-IID data Fading channel, SNR is 20 dB (D=2000, K=10)

Figures 1, 2A, 2B:
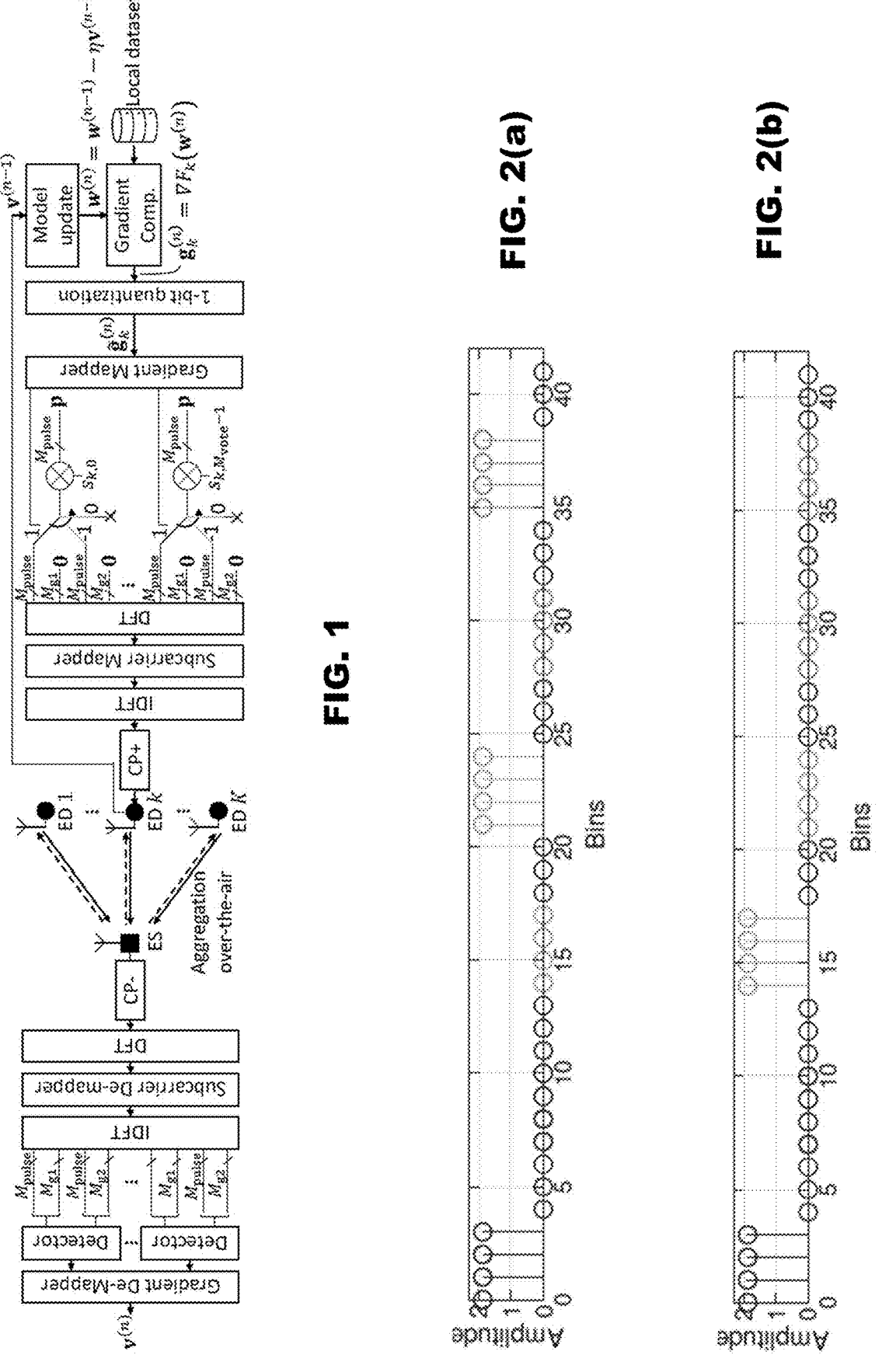

Repeat use of reference characters in the present specification and figures is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to first and second aspects of methods and apparatuses for reliable over-the-air computation and federated edge learning.

II. System Model of a First Aspect

We consider a FEEL system based on gradient-averaging [7] with K users and adopt signSGD[8]. We assume that the initial values of the model parameters, denoted by $w \in Rq$, and its structure are distributed to the EDs from an ES to set up a common learning model at the EDs before the training, where q is the model size. The local dataset containing labeled data samples at the kth ED is shown as $\{(x_l, y_l)\} \in Dk$ for k=1, . . . , K, where $x_l$ and $y_l$ are lth data sample and its associated label, respectively. We assume identical local dataset sizes, i.e., $|D_k|=D$ for $k=1, \ldots, K$.

A. Learning Model

To obtain the trained model without uploading the local data to the ES, for each communication round n of FEEL, the kth ED calculates the local gradient of the loss function by using its local dataset $D_k$ and the parameter vector w(n) as $$ g_k^{(n)} = \frac{1}{D} \sum_{\forall \ell \in \mathcal{D}_k} \nabla f\big(w^{(n)}, x_\ell, y_\ell\big), $$

where $\nabla$ is the gradient operator and f (w(n), $x_\ell$, $y_\ell$) is the loss function quantifying the labeling error for the parameters w(n).

The EDs transmit the signs of their local gradients, i.e., $$ g_k^{(n)} $$

for $k=1, \ldots, K$, to the ES, where the ith element of $$ g_k^{(n)} $$

is $$ \tilde{g}_{k,i}^{(n)} \triangleq \text{sign}\left(g_{k,i}^{(n)}\right) $$

and w(0)=w. The estimate of the global gradient for the ith parameter can be calculated by using the MV principle as given by $$ v_i^{(n)} \triangleq \text{sign}\left(y_i^{(n)}\right), $$

where $$ y_i^{(n)} = \sum_{k=1}^{K} \tilde{g}_{k,i}^{(n)}. $$

The ES then broadcasts $$ v(n) = \left[v_0^{(n)}, \ldots, v_{q-1}^{(n)}\right]^T $$

to the EDs and the models at the EDs are updated, e.g., $w^{n+1}=w^{(n)}-\eta v^{(n)}$, where $\eta$ is the learning rate. This process is repeated until a criterion is achieved.

B. Signal Model

In this disclosure, we assume that the EDs access the wireless channel on the same time-frequency resources simultaneously with S DFT-s-OFDM symbols. The mth transmitted baseband DFT-s-OFDM symbol in discrete time for the kth ED can be expressed as $$ t_{k,m} = F_N^H M_f D_M d_{k,m} $$

where $$ F_N^H \in \mathbb{C}^{N \times N} $$

is the N-point inverse DFT (IDFT) matrix, $D_M \in \mathbb{C}^{M \times M}$ is the M-point DFT matrix, $M_f \in \mathbb{R}^{N \times M}$ is the mapping matrix that maps the output of the DFT precoder to a set of contiguous subcarriers, and $d_{k,m} \in \mathbb{C}^M$ contains the symbols on M bins. Note that DFT-s-OFDM is a special single-carrier (SC) waveform using circular convolution[11], where the symbol spacing in time is $T_{spacing}=NT_{sample}/M$ seconds, the pulse shape is Dirichlet sinc[12], and $T_{sample}$ is the sample period.

In this disclosure, we assume the cyclic prefix (CP) duration is larger than the maximum-excess delays of the channels between the ES and the EDs. Hence, assuming the transmissions from the EDs arrive at the ES within the CP duration, the mth received baseband signal in discrete time can be written as $$ r_m = \sum_{k=0}^{K-1} H_k t_{k,m} + n_m, \tag{2} $$

where $H_k \in \mathbb{C}^{N \times N}$ is a circular-convolution matrix based on the channel impulse response (CIR) between the kth ED and the ES and $$ n_m \sim \mathcal{CN}\left(0_N, \sigma_n^2 I_N\right) $$

is the additive white Gaussian noise (AWGN).

At the ES, we calculate the aggregated symbols on the bins as $$ \tilde{d}_m = D_M^H M_f^H F_N r_m, $$

where $\tilde{d}_m \in \mathbb{C}^M$ are the received symbols on the bins. We do not use equalization as our goal is to determine the MV, noncoherently.

We define the peak-to-mean envelope power ratio (PMEPR) as $\max_{t \in (0, T_n)} |x(t)|^2 / P_{tx}$, where $x(t) \in \mathbb{C}$ is the baseband OFDM symbol in continuous time, $T_s$ is the symbol duration, and $P_{tx} = \mathbb{E}_t[|x(t)|^2] = M/N$ is the mean-envelope power as $$ \|d_{k,m}\|_2^2 $$

is equal to M when all bins are actively utilized.

III. Majority Vote with PPM Via DFT-S-OFDM of a First Aspect

A. Transmitter

At the transmitter, we encode the votes with PPM. We propose to synthesize the pulse in a PPM symbol by activating consecutive $M_{pulse}$ bins of DFT-s-OFDM, which effectively corresponds to a pulse with the duration of $T_{pulse}=M_{pulse}T_{spacing}$ seconds by combining $M_{pulse}$ shifted versions of the Dirichlet sinc functions in time. To accommodate the time-synchronization errors between the ES and EDs with the maximum duration of $T_{sync}$ seconds and the maximum excess delay with $T_{chn}$ seconds, we consider guard periods between the pulses. Thus, we deactivate the following $M_{gap}$ bins after $M_{pulse}$ active bins, which results in a guard period with the duration of $T_g \approx M_{gap} T_{spacing}$ seconds, where $T_g \geq T_{chn} + T_{sync}$ must hold true. As a result, the maximum number of votes that can be carried for each DFT-s-OFDM symbol can be calculated as $$M_{vote} = \left\lfloor \frac{M}{2(M_{pulse} + M_{gap})} \right\rfloor, \qquad (3)$$

where $M_{gap} \geq \lceil (T_{chn} + T_{sync})/T_{spacing} \rceil$.

In this disclosure, we consider a generalized mapping rule that maps the quantized gradients to the positions of the pulses within a DFT-s-OFDM symbol and S DFT-s-OFDM symbols. To this end, let f be a function that maps $i \in \{0, 1, \ldots, q-1\}$ to the distinct pairs $(m_0, l_0)$ and $(m_1, l_1)$ that indicate the pulse positions for $m_0, m_1 \in \{0, 1, \ldots, S-1\}$ and $l_0, l_1 \in \{0, 1, \ldots, 2M_{vote}-1\}$. Let $q_{m_0,l_0} \in \mathbb{C}^{M_{pulse}}$ and $q_{m_1,l_1} \in \mathbb{C}^{M_{pulse}}$ be vectors based on $$\tilde{g}_{k,i}^{(n)}$$

as $$q_{m_0,l_1} \triangleq \begin{cases} p \times s_{k,i} & \tilde{g}_{k,i}^{(n)} = 1, \\ 0, & \tilde{g}_{k,i}^{(n)} = 0, \\ 0, & \tilde{g}_{k,i}^{(n)} = -1 \end{cases} \qquad (4)$$

and $$q_{m_1,l_1} \triangleq \begin{cases} 0, & \tilde{g}_{k,i}^{(n)} = 1, \\ 0, & \tilde{g}_{k,i}^{(n)} = 0, \\ p \times s_{k,i}, & \tilde{g}_{k,i}^{(n)} = -1 \end{cases} \qquad (5)$$

respectively, where $p \in \mathbb{C}^{M_{pulse}}$ contains the weights of the Dirichlet sinc functions to generate the pulse, and $s_{k,i}$ is a randomization symbol for $k \in \{1, \ldots, K\}$.

We then map $q_{m_0,l_0}$ and $q_{m_1,l_1}$ to the bins of DFT-s-OFDM symbols as $$(d_{k,m_0}) \frac{l_0(M_{pulse} + M_{gap}) + M_{pulse} - 1}{l_0(M_{pulse} + M_{gap})} = q_{m_0,l_0} \text{ and} \qquad (6)$$

$$(d_{k,m_1}) \frac{l_1(M_{pulse} + M_{gap}) + M_{pulse} - 1}{l_1(M_{pulse} + M_{gap})} = q_{m_1,l_1}, \qquad (7)$$

respectively.

Therefore, the proposed scheme defines two pulse positions over two different time resources for the voting options. If $m_1 = m_0$ and $l_1 = l_0 + 1$ for all i, the adjacent time resources of $m_0$th DFT-s-OFDM symbol are used for voting. We denote the proposed scheme with this specific mapping as OBDA-PPM.

We choose p as $\sqrt{E_s} \times [1, -1, 1, -1, \ldots]^T$ since this sequence yields a rectangular-like pulse shape in the time domain for DFT-s-OFDM, as illustrated in Section IV, where $E_s = 2(M_{pulse} + M_{gap})/M_{pulse}$ is an energy normalization factor. It is worth noting that the proposed framework allows one to design p for various pulse shapes, which can be considered for further optimization of the proposed scheme.

B. Receiver

At the ES, we first calculate the pairs $(m_0, l_0)$ and $(m_1, l_1)$ based on f for a given i. Since the multipath channel disperses the pulse in a PPM symbol in the time domain and the synchronization error changes the position of the pulse in time, we consider $M_{pulse} + M_{gap}$ bins for the energy calculation and define $$\tilde{q}_{m_0,l_0} \triangleq (d_{k,m_0}) \frac{l_0(M_{pulse} + M_{gap}) + M_{pulse} + M_{gap} - 1}{l_0(M_{pulse} + M_{gap})} \qquad (8)$$

and $$\tilde{q}_{m_1,l_1} \triangleq (d_{k,m_1}) \frac{l_1(M_{pulse} + M_{gap}) + M_{pulse} + M_{gap} - 1}{l_1(M_{pulse} + M_{gap})}. \qquad (9)$$

Assuming independent multi-path channels between the EDs and ES, it can be shown that $$\mathbb{E}\left[\|\tilde{q}_{m_0,l_0}\|_2^2\right] \approx M_{pulse} E_s K_0 + (M_{pulse} + M_{gap})\sigma_n^2 \text{ and} \qquad (10)$$

$$\mathbb{E}\left[\|\hat{q}_{m_1,l_1}\|_2^2\right] \approx M_{pulse} E_s K_1 + (M_{pulse} + M_{gap})\sigma_n^2, \qquad (11)$$

where $K_0$ and $K_1$ are the number of EDs that contribute a vote towards 1 and $-1$, respectively.

Hence, the energies of $\tilde{q}_{m_0,l_0}$ and $\tilde{q}_{m_1,l_1}$ can be compared to obtain the MV as $$v_i^{(n)} = \begin{cases} 1, & \|\tilde{q}_{m_0,l_0}\|_2^2 > \|\tilde{q}_{m_1,l_1}\|_2^2 + t \\ -1, & \|\tilde{q}_{m_1,l_1}\|_2^2 > \|\tilde{q}_{m_0,l_0}\|_2^2 + t, \\ 0, & \text{otherwise} \end{cases} \qquad (12)$$

where t is a constant to resolve ties that occur.

Figure 2C:
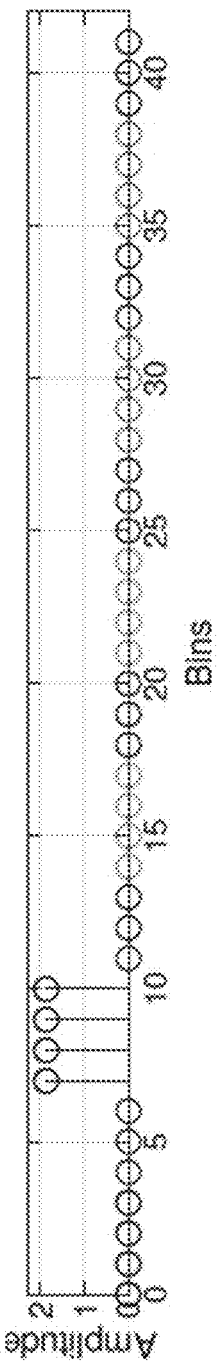
Figure 2D:
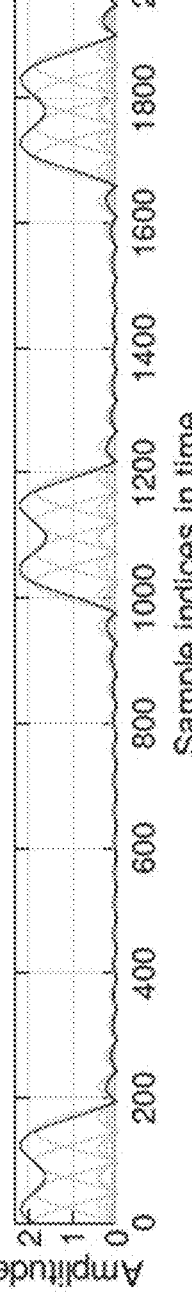
Figure 2E:
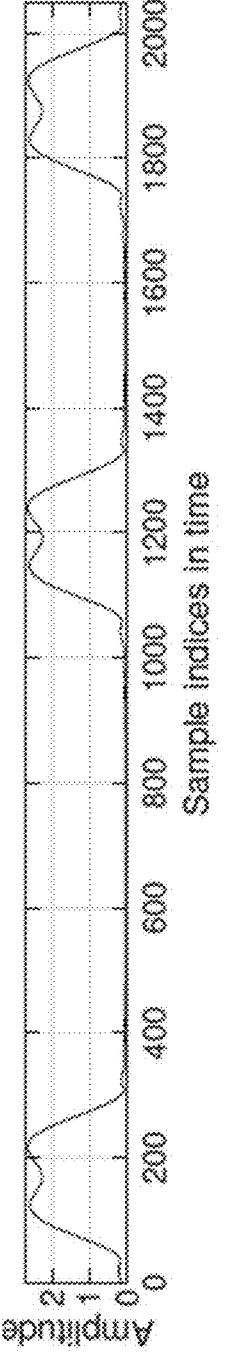
Figure 2F:
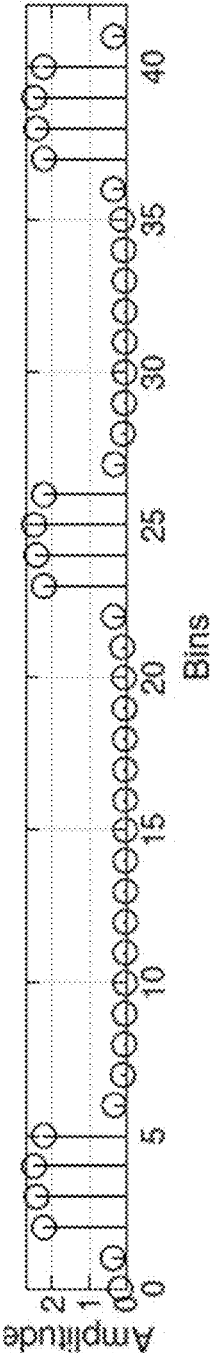
Figure 3D:
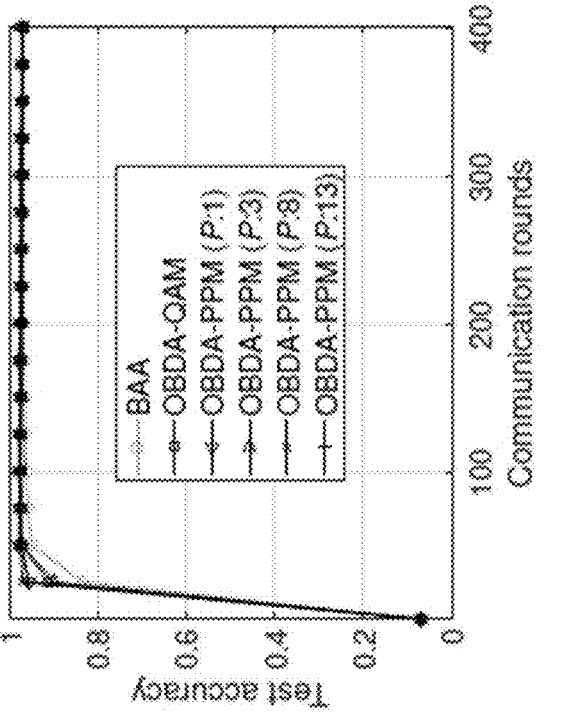
Figure 3C:
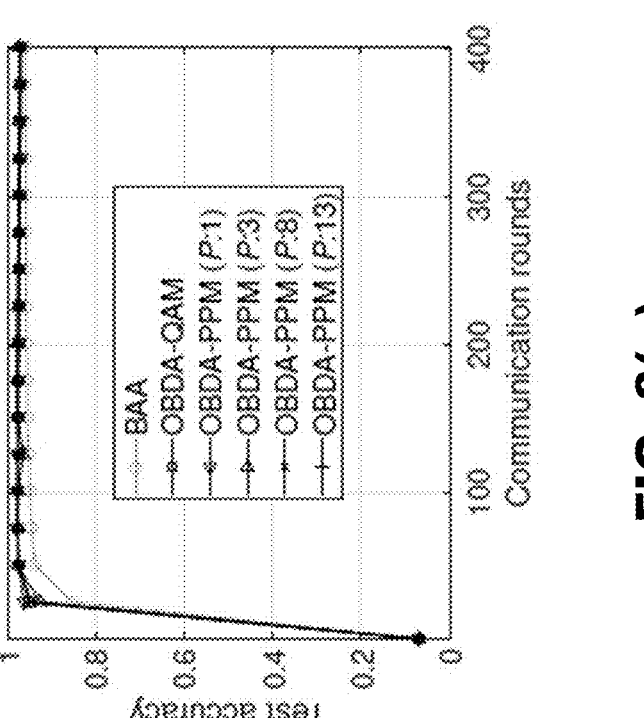
Figure 3F:
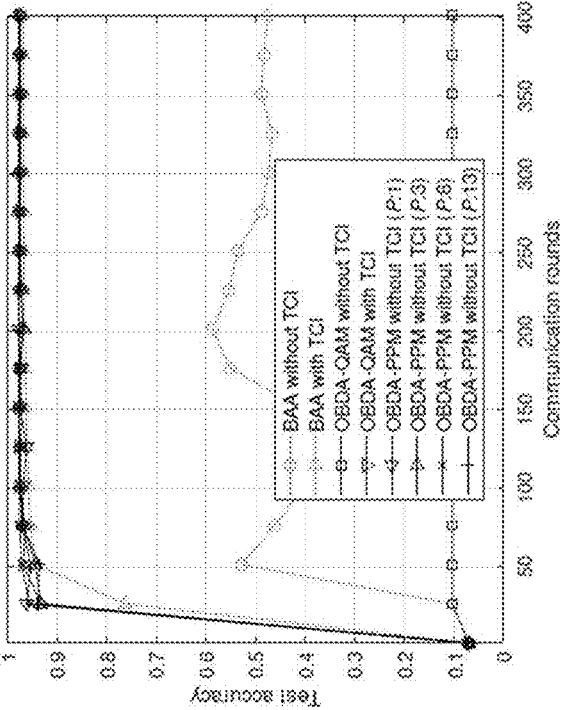
Figure 3E:
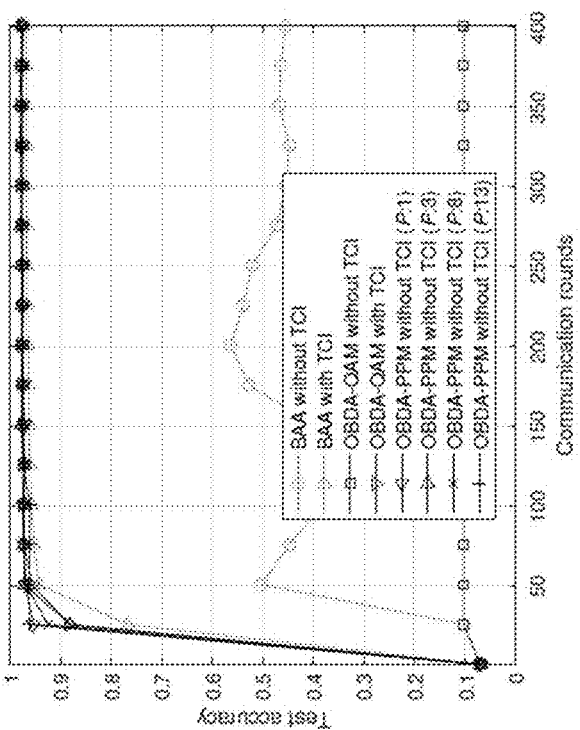
Figure 3H:
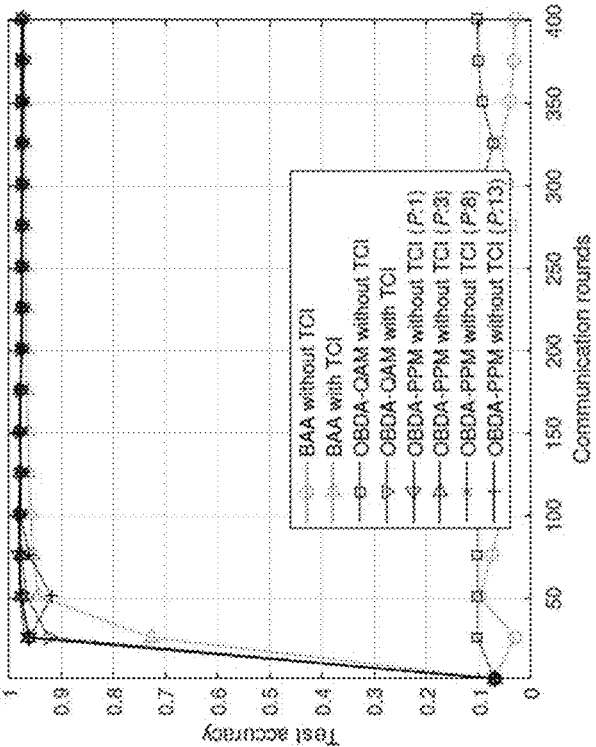
Figure 3G:
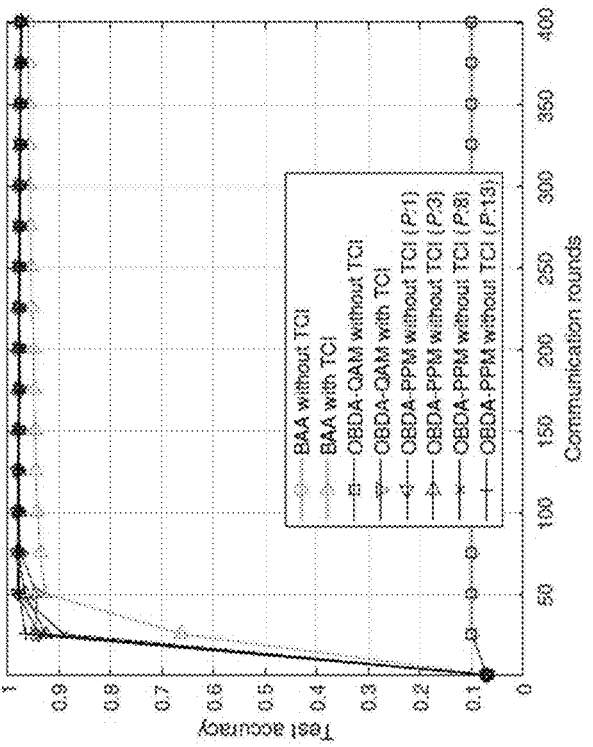
Figure 4B:
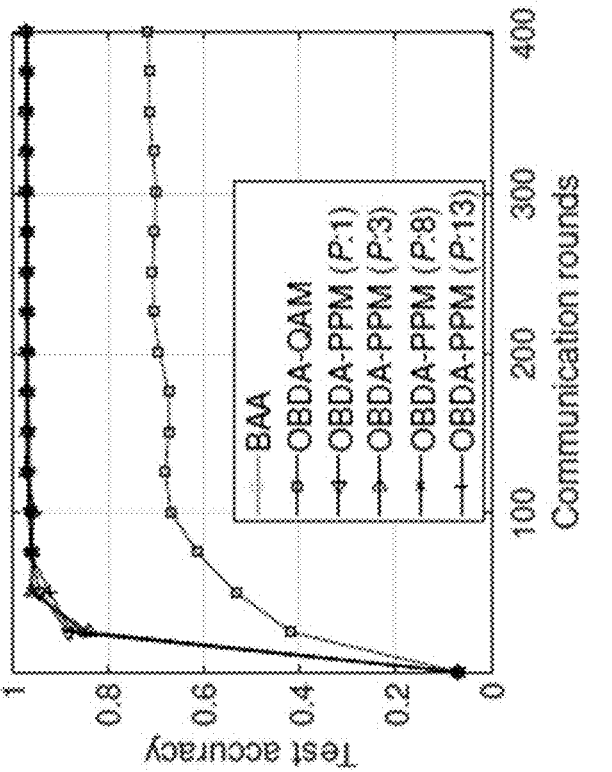
FIGS. 4(*a*)-4(*h*) graphically show first aspect herewith test accuracy results for non-IID data, where the FEEL with the OBDA-PPM works without the CSI in both AWGN and fading channel.
Figure 4A:
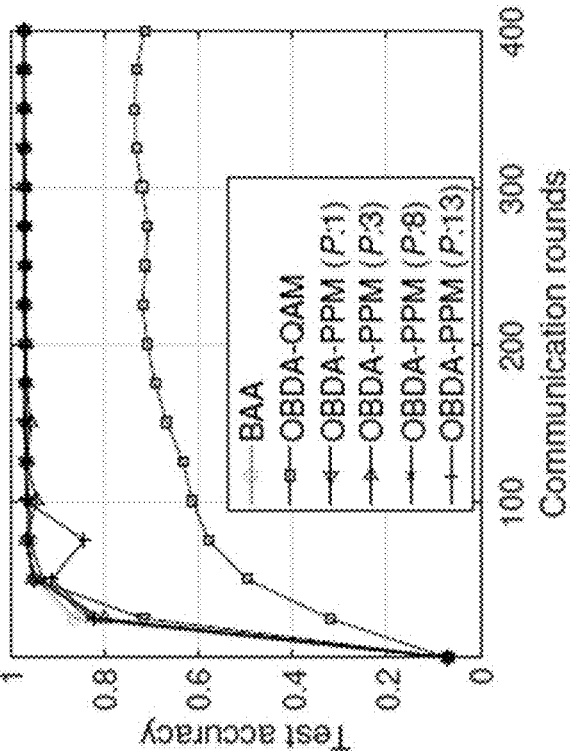
Figures 4C, 4D:
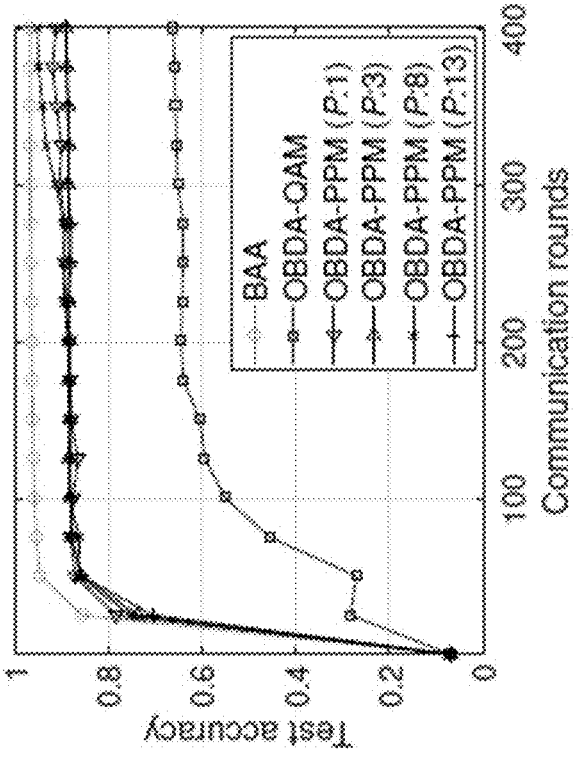
Figure 4F:
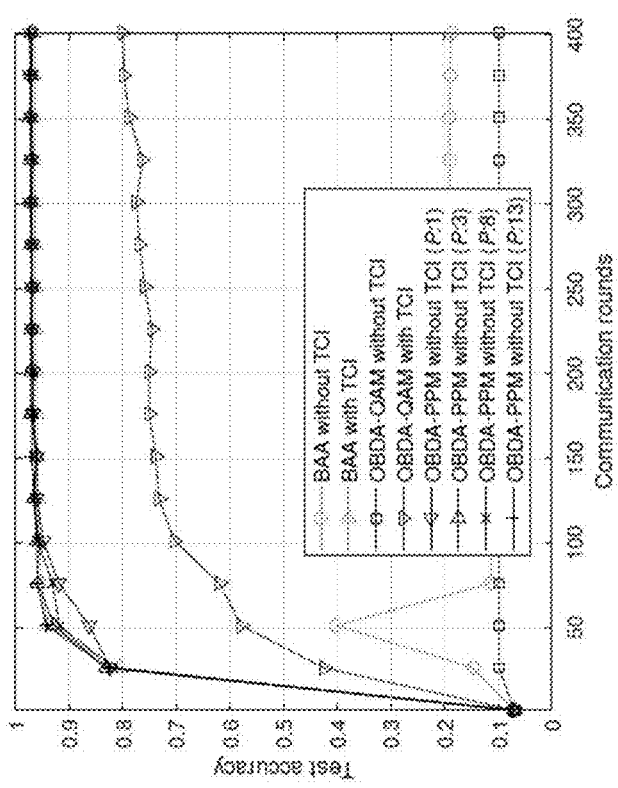
Figure 4E:
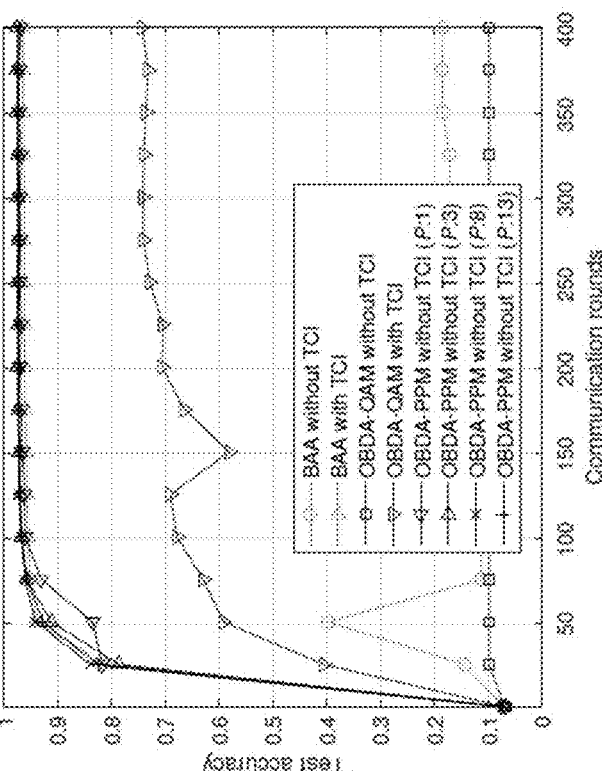
Figure 4H:
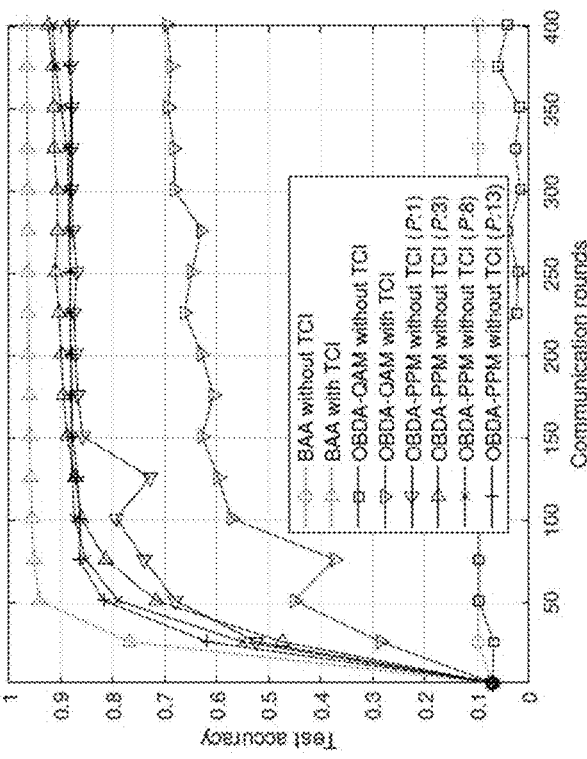
Figure 4G:
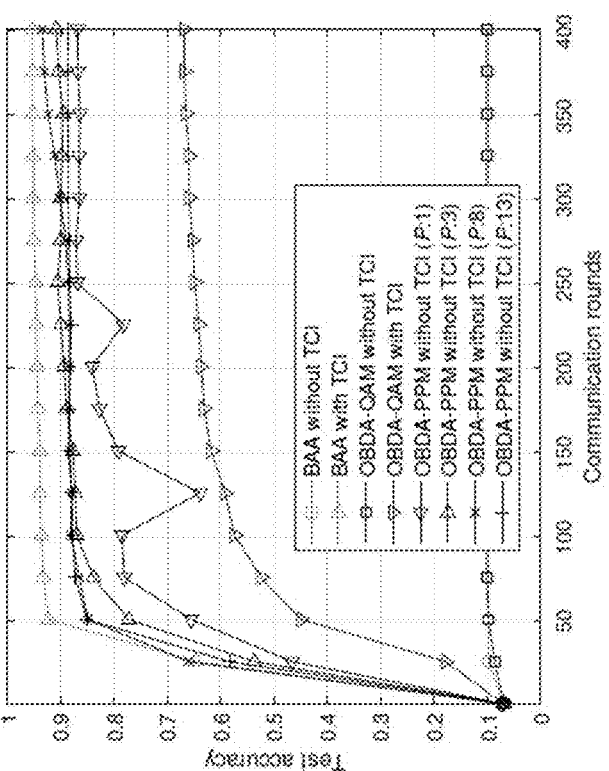

FIG. 1 is a schematic illustration of an exemplary presently disclosed embodiment (first aspect) of federated edge learning (FEEL). In FIG. 1, the transmitter and the receiver block diagrams are provided based on the aforementioned discussions. The MV principle with a first aspect of the proposed scheme is also exemplified in FIG. 2 for K=3 EDs, $M_{pulse}=4$, $M_{gap}=3$, $M_{vote}=3$, M=42, and N=2048. In FIGS. 2(a)-(c), the votes from three EDs are provided for three gradients. In FIG. 2(d), the first ED's signal in the time domain is shown, where the pulses are generated based on the summation of shifted Dirichlet sinc functions. In FIG. 2(e), the first ED's signal includes the synchronization error and the time dispersion due to the multi-path channel. In FIG. 2(f), the ED's votes (excluding the other EDs) after the receiver processing is shown. In FIG. 2(g), the aggregated votes from all EDs on the bins are shown. Based on this example, the MV vector at the ES can be calculated as $$v^{(n)} = (v_0^{(n)}, v_1^{(n)}, v_2^{(n)}) = (1, 0, -1)$$

based on (12), where we assume a tie for the second gradient.

C. Trade-Offs and Comparisons

The main difference of the proposed scheme as compared to other approaches[6]-[7] is that it does not need channel inversions at the EDs and prevents the loos of the gradients due to the truncation. Further, as opposed to other methods[9]-[10], it also does not require CSI at the ES or multiple antennas. Therefore, the proposed scheme offers practical distributed learning in mobile networks. The second major difference of the proposed scheme is that it leads to an interesting tradeoff between PMEPR and resource utilization, while OBDAQAM can suffer from high PMEPR as shown in Section IV. For a given $M_{gap}$, the larger $M_{pulse}$ is, the pulse energy distributes more evenly in time and the amplitude decreases as less votes are carried. This results in a decreasing PMEPR, but more resource consumption. The shortcoming of the proposed scheme is that it consumes a larger number of DFT-s-OFDM symbols as compared to BAA and OBDA-QAM. Although this appears as an issue, we emphasize that the proposed method eliminates the non-negligible channel estimation overhead.

IV. Numerical Results of a First Aspect

We consider a handwritten-digit recognition learning task over a FEEL system, in which we compare the proposed scheme with BAA[6] for gradient averaging and OBDA-QAM[7]. The learning task uses the MNIST dataset which contains labelled handwritten-digit images of size 28×28, from 0 to 9. For an IID dataset, 20,000 training images are randomly partitioned into equal shares for $K \in \{10, 50\}$ EDs; for a non-IID dataset, each data set contains 5 different labels, and the images are chosen randomly for each ED, where a different dataset can contain the same image. The model consists of one 5×5 and two 3×3 convolutional layers, each consisting of 20 filters, and the subsequent layers to each are a batch normalization and rectified-linear unit (ReLU) activation layer. Following the final ReLU layer, a fully connected layer of 10 units corresponding to the 0 to 9 digits and a softmax layer are utilized. Normalization at the input layer is not applied to the images. For each update, stochastic gradient descent with a momentum of 0:9 is applied. The initial learning rate is 0:01, decaying by a rate of 0:05 after each communication round.

Our model contains q=123,090 learnable parameters, which, for BAA and OBDA-QAM, correspond to S=103 and S=52 OFDM symbols with M=1200 subcarriers, respectively. $T_s$, the threshold for TCI and t are set to 66:67 μs, 0:2 and 0:01, respectively. To test FEEL, two different uplink signal-to-noise ratios (SNRs) of 0 dB and 20 dB are considered. ITU Extended Pedestrian A (EPA) with no mobility is considered for the fading channel, and the channels between the EDs and ES are regenerated to capture the long-term channel variations. The root-mean-square (RMS) delay spread of the EPA channel is $T_{rms}$=43:1 ns. As a rule of thumb, we assume that the maximum-excess delay is $$T_{chn} \triangleq 4T_{rms} = 172:5 \text{ ns.}$$

The signal bandwidth is 18 MHz. Therefore, the maximum synchronization error among the EDs is reciprocal of the bandwidth, i.e., 55:6 ns. We also assume that ES intentionally start the processing by backing of 4 samples in the time domain, which corresponds to 130:2 ns, for 30:72 MHz sample rate and N=2048. Therefore, we set $M_{gap} \geq \lceil (T_{chn} + T_{sync})/T_{spacing} \rceil = 7$, where $T_{spacing}$=55:6 ns and total synchronization error $T_{sync}$=185:7 ns. The number of DFT-s-OFDM symbols for $M_{pulse}$=1, $M_{pulse}$=3, $M_{pulse}$=8, and $M_{pulse}$=13 can be then calculated as 1642, 2052, 3078, and 4108, respectively.

The first aspect herewith test accuracy results for IID data are provided in FIG. 3. For an AWGN channel, with SNRs of 0 dB and 20 dB for K=10 and K=50, each scheme converges and presents high test accuracy, as demonstrated in FIG. 3(a)-(d). In FIG. 3(e)-3(h), the fading channel is considered. Both BAA and OBDA-QAM fail in the absence of TCI but provide high test accuracy with TCI present. OBDAPPM with the prior stated $M_{pulse}$ values report high test accuracy without TCI or CSI at the ES. In FIG. 4, we conduct the same test (re first aspect herewith) for non-IID data. Here, we begin to see larger discrepancies in the reported accuracy across all methods. In FIG. 4(a)-(d), both BAA and OBDA-PPM perform significantly better than OBDA-QAM for all values of K; however, for K=10, OBDA-PPM performs slightly worse than that of BAA, demonstrating that for a low population, the accuracy slightly suffers. With the inclusion of the fading channel, similar results are shown. In FIG. 4(e)-(h), the behavior is similar to that of IID test accuracy, with the major difference being that OBDA-QAM fails with and without TCI. A unique result that appears in this case is for lower values of K, the accuracy degrades at a faster rate for lower values of $M_{pulse}$ than at higher ones.

Figure 6:
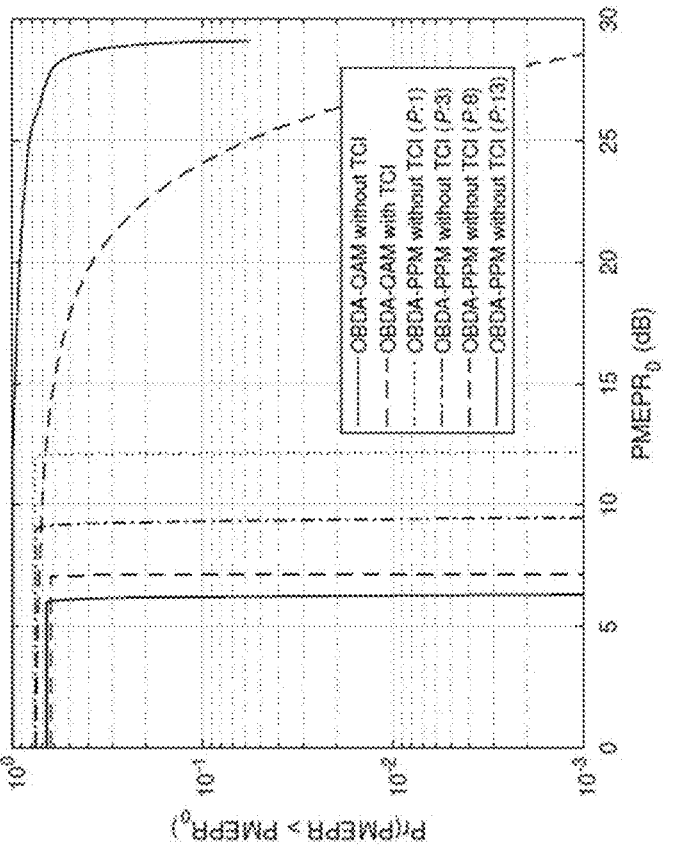
FIG. 6 graphically illustrates first aspect herewith peak-to-mean envelope power ratio (PMEPR) distributions.
Figure 5:
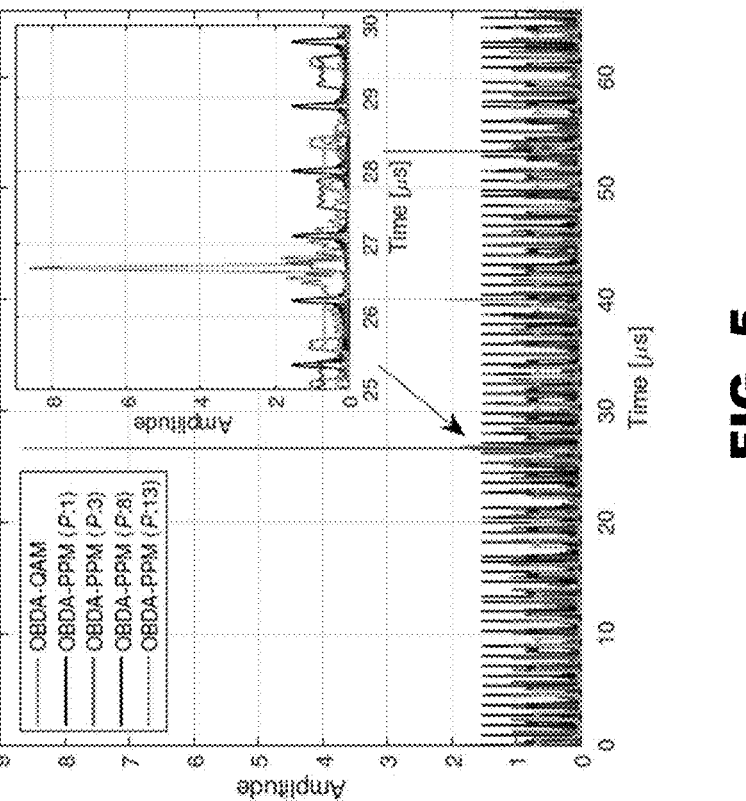
FIG. 5 graphically illustrates first aspect herewith instances of the OBDA-PPM signals and OBDA with quadrature amplitude modulation (QAM) signals.

FIG. 5 details the temporal characteristics of OBDA-QAM and OBDA-PPM re first aspects herewith. Here, we see that the signal can be very peaky with OBDA-QAM when all the QAM symbols are similar to each other. For OBDA-PPM, this is not an issue as the votes are represented as separated pulses in time. FIG. 6 shows the PMEPR for both OBDA-QAM and OBDA-PPM re first aspects herewith. We begin to see the unique trade-off that $M_{pulse}$ presents. For OBDA-QAM, the PMEPR is exceptionally high, as is an innate problem with this design. In contrast, OBDA-PPM mitigates the PMEPR much more aggressively, yielding results that are much smaller in magnitude. The trade-off displayed is that as $M_{pulse}$ rises, the PMEPR curve diminishes but, as demonstrated in FIG. 5, more resources in time are consumed.

V. Concluding Remarks of a First Aspect

In this disclosure, we propose an AirComp method that relies on PPM symbols synthesized through DFT-s-OFDM. We show how to design the PPM symbols based on the synchronization errors and delay spread. The main advantage of the proposed scheme is that it eliminates CSI at the EDs and ES while proving high test accuracy. Therefore, it offers a promising solution for distributed learning over mobile wireless networks. Also, it can substantially reduce the PMEPR as compared to OBDA-QAM, where the improvement on PMEPR can be adjusted at the expense of higher resources consumed in the time domain.

VI. System Model of a Second Aspect

We consider an OFDM-based FEEL system with K users. Prior to the training, the initial values of the model parameters, denoted by $w \in R_q$, and its structure are distributed to the EDs from an ES to set up a common learning model at the EDs, where q is the model size. We denote the local dataset containing labeled data samples at the kth ED as $\{(x_l, y_l)\} \in D_k$ for k=1; . . . , K, where $x_l$ and $y_l$ are lth data sample and its associated label, respectively. The main goal of the FEEL system is to obtain the trained model parameters without uploading the local data to the ES.

A. Learning Model

The local loss function of the model with the parameters w at the kth ED can be calculated as $$F_k(w) = \frac{1}{|\mathcal{D}_k|} \sum_{\forall (x_\ell, y_\ell) \in \mathcal{D}_k} f(w, x_\ell, y_\ell), \quad (13)$$

where f(w, $x_\ell$, $y_\ell$) is the sample loss function that measures the labelling error for ($x_\ell$, $y_\ell$) for the parameters w.

Assuming identical local dataset sizes, i.e., $|D_k|$=D for k=1; . . . , K, the global loss function can be measured as $$F(w) = \frac{1}{K} \sum_{k=1}^{K} F_k(w). \quad (14)$$

In this disclosure, we focus on a FEEL system based on gradient averaging[7]. For each communication round n of FEEL, the kth ED calculates an estimate of the global gradient of the loss function in (2) by using its local dataset $D_k$ and the parameter vector $w^{(n)}$. Assuming that all data samples in $D_k$ are used for gradient estimation, the local gradient estimate for the kth ED at the nth communication round, denoted by $$g_k^{(n)},$$

can be expressed as $$g_k^{(n)} = \nabla F_k(w^{(n)}) = \frac{1}{D} \sum_{\forall \ell \in \mathcal{D}_k} \nabla f(w^{(n)}, x_\ell, y_\ell), \quad (15)$$

where $\nabla$ represents the gradient operator.

Assuming that the local gradient estimates are reliably received at the ES, the ES can obtain the global estimate of the gradient of the loss function in (14) as $$\hat{g}^{(n)} = \frac{1}{K} \sum_{k=1}^{K} g_k^{(n)}. \quad (16)$$

Subsequently, the ES distributes the global gradient estimate $g^{(n)}$ to the EDs and the current model is updated based on a common update rule, e.g., gradient descent given by $w^{(n+1)}=w^{(n)}-n\hat{g}^{(n)}$, where n is the learning rate and $w^{(1)}=w$. This process is repeated consecutively until a predetermined convergence criterion is achieved.

In this disclosure, we adopt signSGD[8] for FEEL. Instead of the actual values of local gradients, the EDs transmit the signs of their local gradients, i.e., $$\hat{g}_k^{(n)}$$

for k=1; . . . , K, to the ES, where the ith element of $$\hat{g}_k^{(n)}$$

is $$\hat{g}_{k,i}^{(n)} \triangleq \text{sign}(g_{k,i}^{(n)}).$$

Then, the estimate of the global gradient for the ith parameter can be calculated by using the MV principle as given by $$v_i^{(n)} \triangleq \text{sign}(y_i^{(n)}), \quad (17)$$

where $$y_i^{(n)} = \sum_{k=1}^{K} \hat{g}_{k,i}^{(n)}.$$

The ES then transmits $$v^{(n)} = \left(v_0^{(n)}, \dots, v_{q-1}^{(n)}\right)$$

to the EDs and the models at the EDs are updated, e.g., $w^{(n+1)}=w^{(n)}-nv^{(n)}$.

B. Signal Model

In this disclosure, we assume that the EDs access the wireless channel on the same time-frequency resources simultaneously for AirComp with S OFDM symbols consisting of M active subcarriers. We assume the transmissions from the EDs are synchronized in both time and frequency and arrive at the ES within the cyclic prefix (CP) duration. We also assume that the CP duration is larger than the maximum-excess delays of the channels between the ES and the EDs. The superposed symbol on the l subcarrier of the mth OFDM symbol at the ES can then be written as $$r_{l,m} = \sum_{k=1}^{K} h_{k,l} t_{k,l,m} + n_{l,m}, \quad (18)$$

where $h_{k,l} \in \mathbb{C}$ is the channel coefficient between the ES and the kth ED on the l subcarrier and $\mathbb{E}[|h_{k,l}|^2]=1$, $t_{k,l,m} \in \mathbb{C}$ is the transmitted symbol from the kth ED on the l subcarrier of the mth OFDM symbol, and $n_l$ is the zero mean additive white Gaussian noise (AWGN) with the variance $$\sigma_n^2$$

on the l subcarrier for l∈{0, 1, . . . M−1} and m∈{0, 1, . . . S−1}.

Let x(t)∈ $\mathbb{C}$ be the baseband OFDM symbol in continuous time for t∈[0,$T_s$), where $T_s$ is the OFDM symbol duration. We define the PMEPR of an OFDM symbol as $\max_{t \in [0, T_s)} |x(t)|^2/P_{tx}$, where $P_{tx}=\mathbb{E}_t[|x(t)|^2]$ is the mean-envelope power. For AirComp schemes, $P_{tx}$ changes based on the gradient information. In this disclosure, for a fair comparison, we calculate $P_{tx}$ when all subcarriers are actively utilized, i.e., $P_{tx}$=M/N, where N is the inverse DFT (IDFT) size.

VII. FSK-Based Majority Vote of a Second Aspect

A. Transmitter

Let f be a bijective function that maps $i \in \{0, 1, \ldots, q-1\}$ to the distinct pairs $(m_0; l_0)$ and $(m_1; l_1)$ for $m_0, m_1 \in \{0, 1, \ldots, S-1\}$ and $l_0, l_1 \in \{0, 1, \ldots, M-1\}$. Based on $$\tilde{g}_{k,i}^{(n)},$$

at the nth communication round, we propose to calculate the symbol $t_{k,l_0,m_0}$ and $t_{k,l_1,m_1}$ as $$t_{k,l_0,m_0} = \begin{cases} \sqrt{E_s} \times s_{k,i} & \tilde{g}_{k,i}^{(n)} = 1, \\ 0, & \tilde{g}_{k,i}^{(n)} = 0 \ , \\ 0, & \tilde{g}_{k,i}^{(n)} = -1 \end{cases} \quad (19)$$

and $$t_{k,l_1,m_1} = \begin{cases} 0, & \tilde{g}_{k,i}^{(n)} = 1, \\ 0, & \tilde{g}_{k,i}^{(n)} = 0 \ , \\ \sqrt{E_s} \times s_{k,i}, & \tilde{g}_{k,i}^{(n)} = -1 \end{cases} \quad (20)$$

respectively, where $E_s = 2$ is the normalized symbol energy and $s_{k,i}$ is a randomization symbol for $k \in \{0, 1, \ldots, K\}$.

Therefore, the proposed scheme separates the options for voting over two different resources identified in time and frequency. In this disclosure, we choose $s_{k,i}$ based on a random quadrature phaseshift keying (QPSK) symbol to reduce PMEPR by decreasing the correlation in the frequency domain[15].

The functionality of f can be divided into two different mappers, i.e., gradient mapper (GM) and resource mapper (RM). While GM shuffles the quantized gradients, RM identifies how the options for voting are distributed to the time and frequency resources. As a special case of RM, if $m_1 = m_0$ and $l_1 = l_0 + 1$ for all i, the adjacent subcarriers of $m_0$th OFDM symbol are used for voting, i.e., FSK over OFDM subcarriers. In this case, the weight of the kth ED's vote in the MV for the ith gradient is independent from its vote since these subcarriers are likely to experience similar channel conditions in practice, i.e., $h_{k,l_0} \cong h_{k,l_0}$. We denote the proposed scheme with this specific RM as OBDA-FSK in this disclosure.

B. Receiver

At the ES, the pairs $(m_0, l_0)$ and $(m_1, l_1)$ are first calculated by using the mapping function f for a given i. Assuming independent multipath channels between the ES and the EDs, it can be shown that $$\mathbb{E}\left[|r_{l_0,m_0}|^2\right] = \mathbb{E}\left[\left|\sqrt{E_s} \sum_{\forall k, \tilde{g}_{k,i}^{(n)}=1} h_{k,l_0} s_{k,i} + n_{l_0,m_0}\right|^2\right] = E_s K_0 + \sigma_n^2, \quad (21)$$

and $$\mathbb{E}\left[|r_{l_1,m_1}|^2\right] = \mathbb{E}\left[\left|\sqrt{E_s} \sum_{\forall k, \tilde{g}_{k,i}^{(n)}=-1} h_{k,l_1} s_{k,i} + n_{l_1,m_1}\right|^2\right] = E_s K_1 + \sigma_n^2, \quad (22)$$

where $K_0$ and $K_1$ are the number of EDs that vote for 1 and $-1$ for the ith gradient, respectively.

Therefore, the energies on the superposed symbols $r_{l_0,m_0}$ and $r_{l_1,m_1}$ can be compared to determine the MV as $$v_i^{(n)} = \begin{cases} 1, & |r_{l_0,m_0}|^2 > |r_{l_1,m_1}|^2 + t \\ -1, & |r_{l_1,m_1}|^2 > |r_{l_0,m_0}|^2 + t \ , \\ 0, & \text{otherwise} \end{cases} \quad (23)$$

where t is the maximum distance between $|r_{l_0,m_0}|^2$ and to $|r_{l_0,m_0}|^2$ declare a tie under AWGN.

Figure 7:
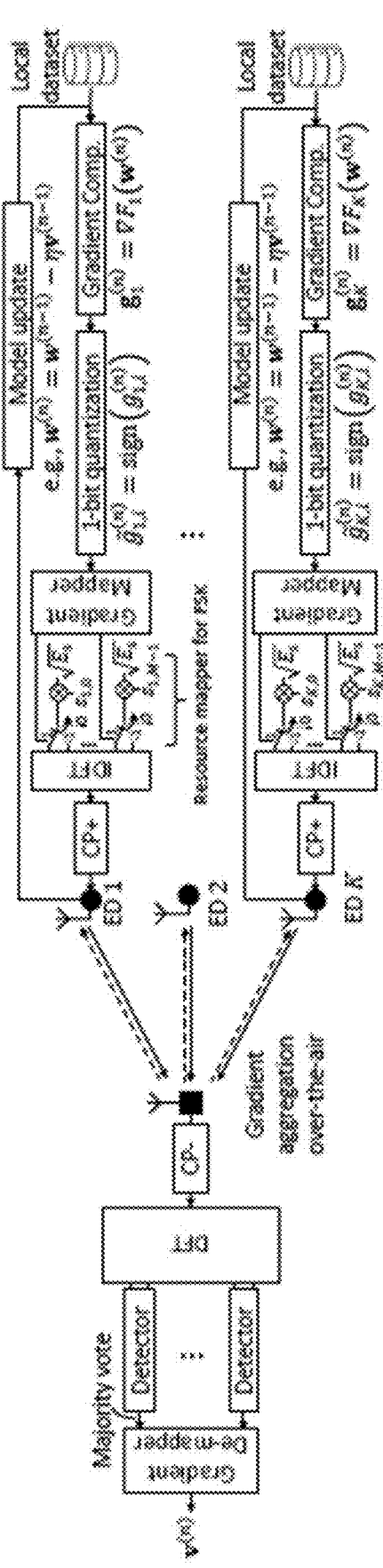
FIG. 7 is a schematic illustration of an exemplary presently disclosed embodiment (second aspect) of federated edge learning (FEEL) with one-bit broadband digital aggregation (OBDA) and frequency-shift keying (FSK) (OBDA-FSK) features.
Figure 8:
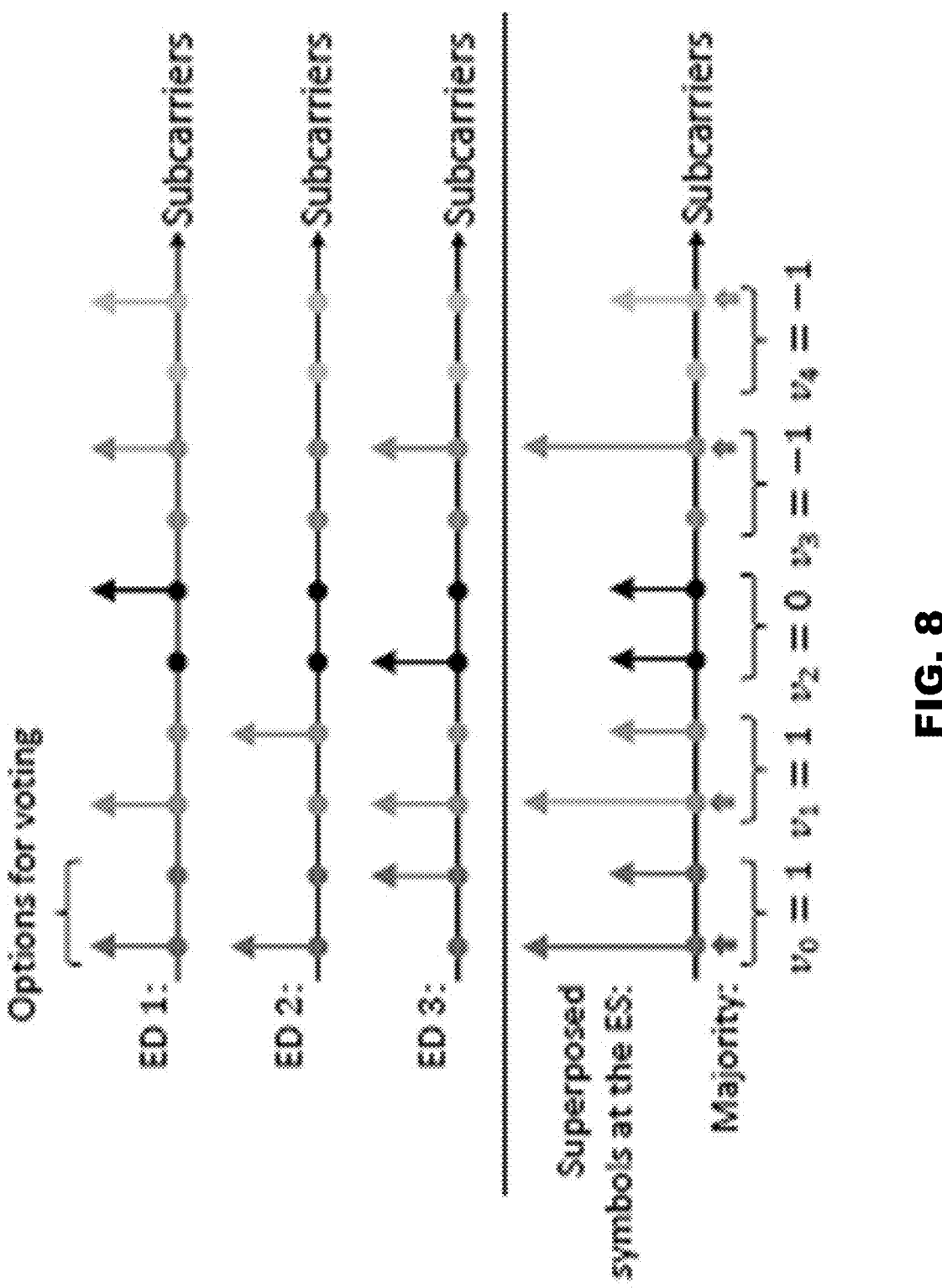
FIG. 8 graphically illustrates an example of MV based on OBDA-FSK (second aspect herewith) with K=3 EDs.
Figures 9A, 9B:
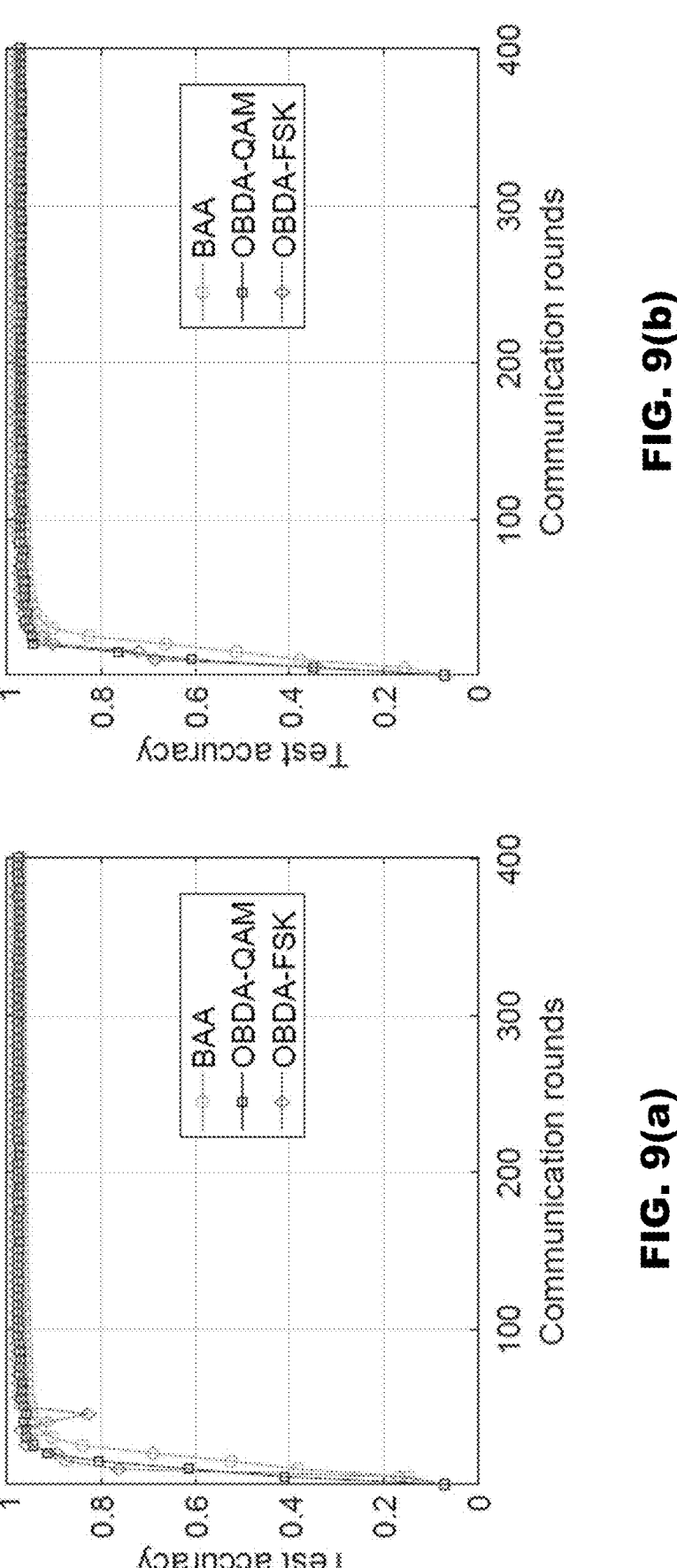
FIGS. 9(*a*)-9(*h*) graphically show second aspect herewith test accuracy results for IID data, where the FEEL with the OBDA-FSK (second aspect herewith) works without the CSI at the EDs and ES, while others require CSI at the EDs.
Figures 9C, 9D:
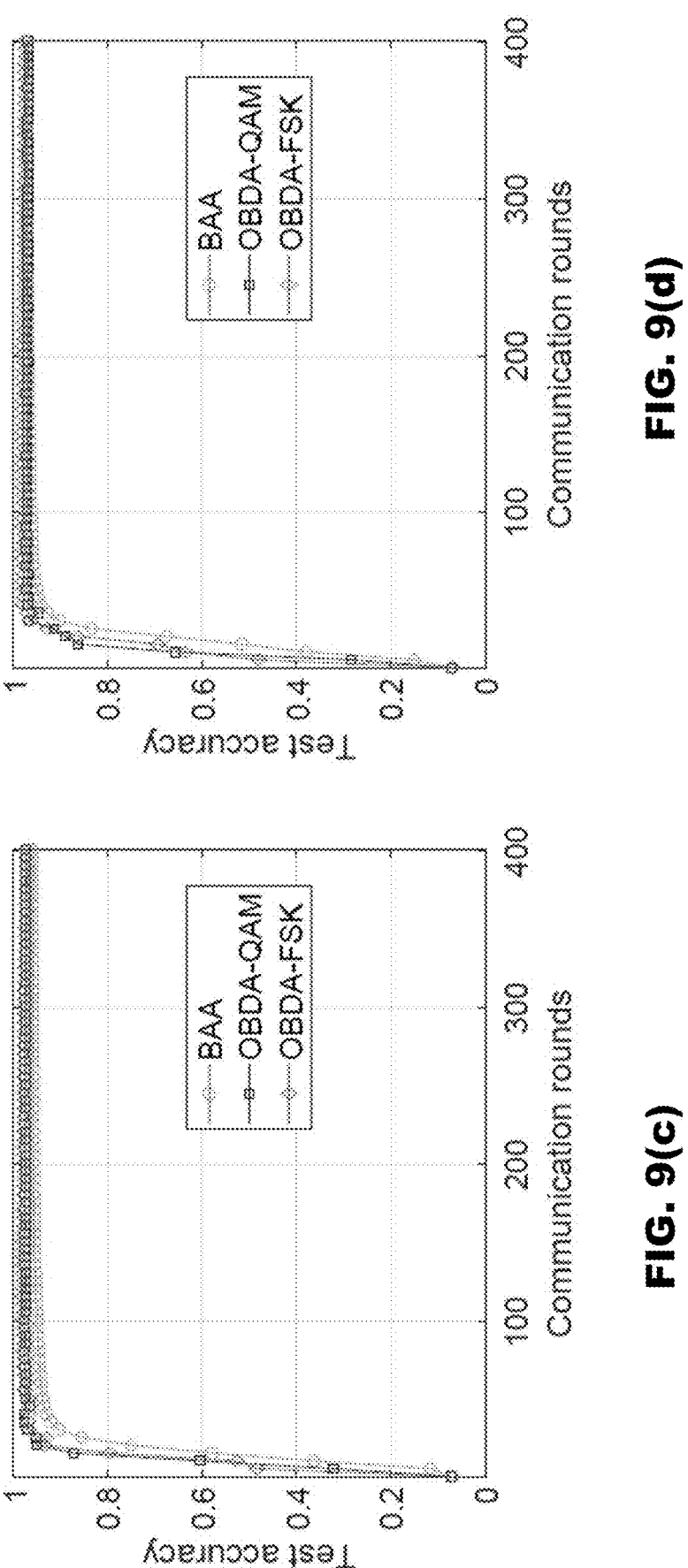
Figure 9F:
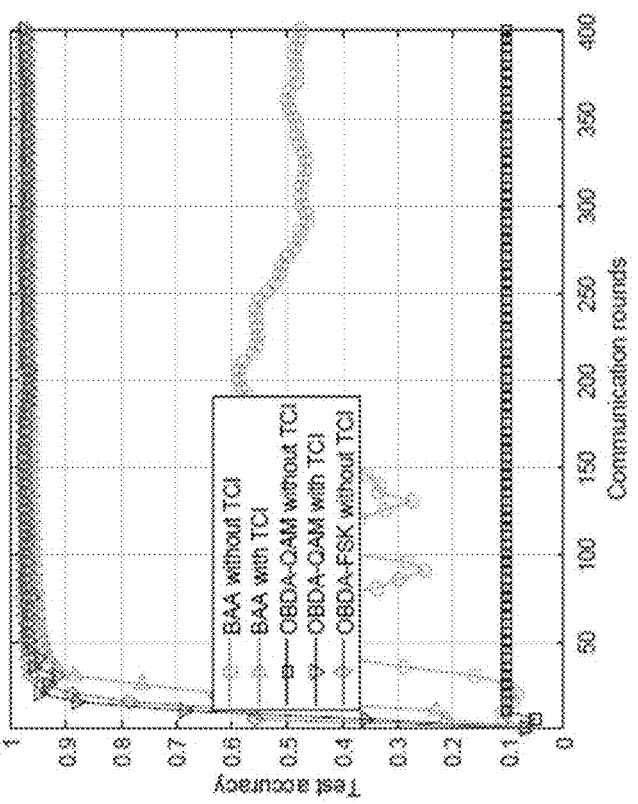
Figure 9E:
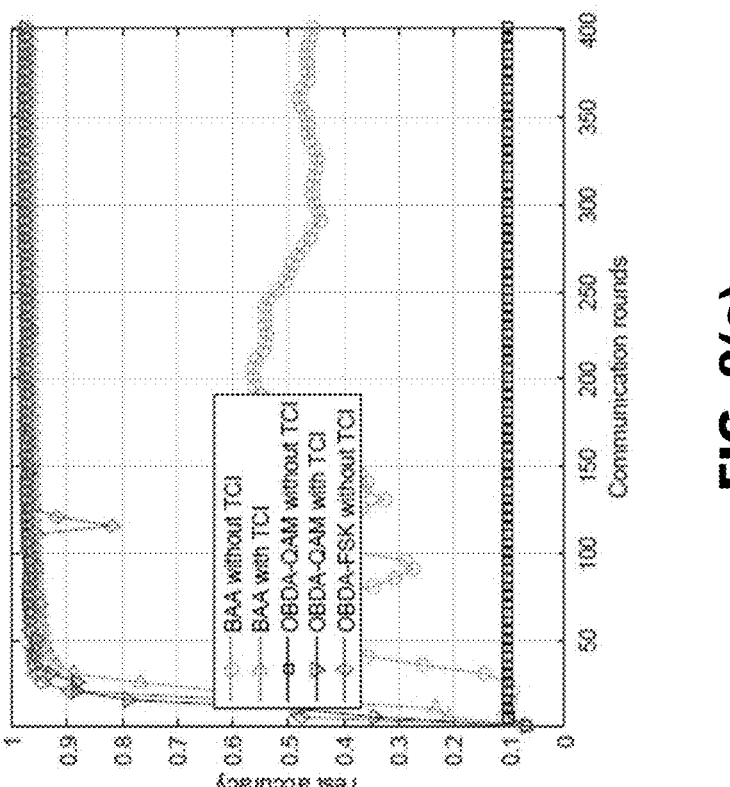
Figure 9H:
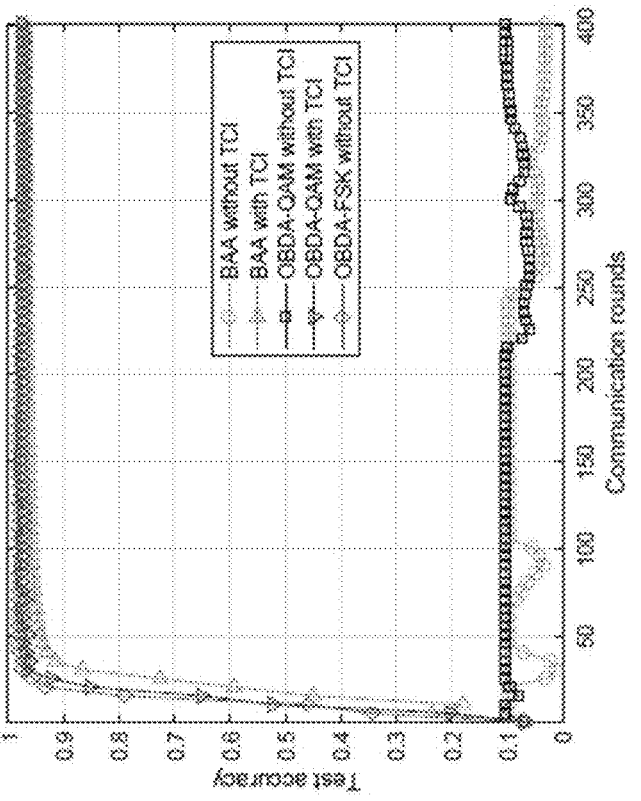
Figure 9G:
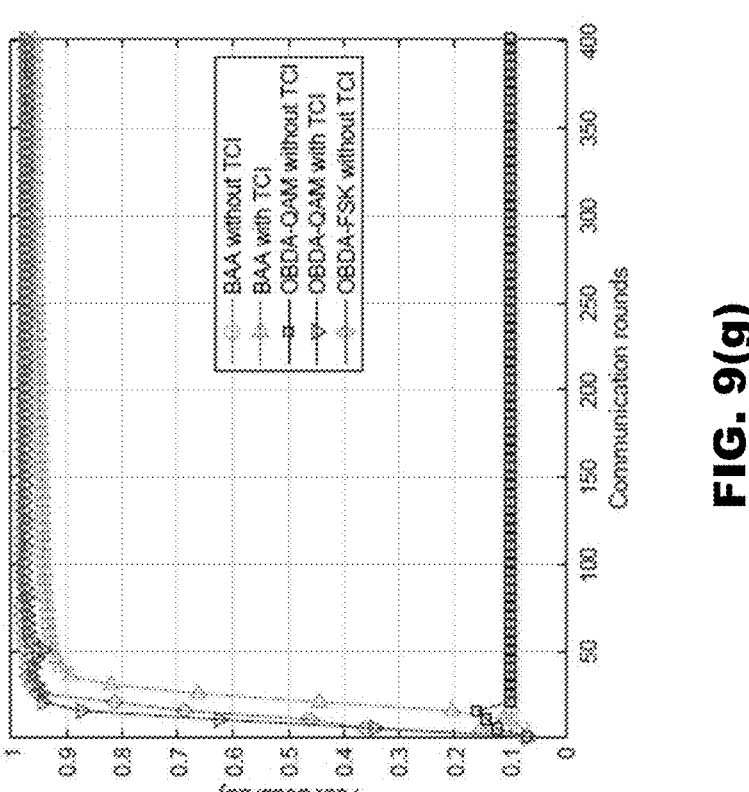
Figures 10A, 10B:
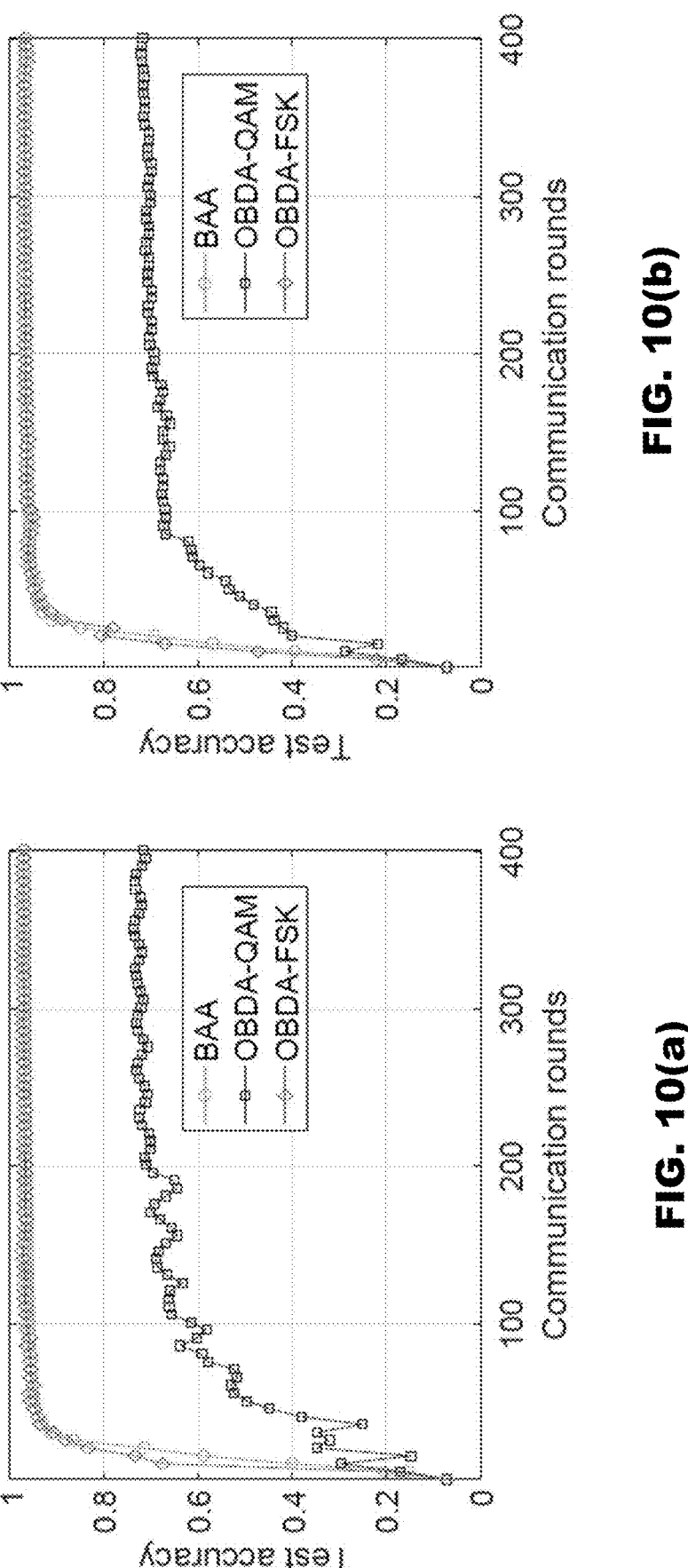
FIGS. 10(*a*)-10(*h*) graphically show second aspect herewith test accuracy results for non-IID data, where the FEEL with the OBDA-FSK converges without the CSI in both AWGN and fading channel.
Figures 10C, 10D:
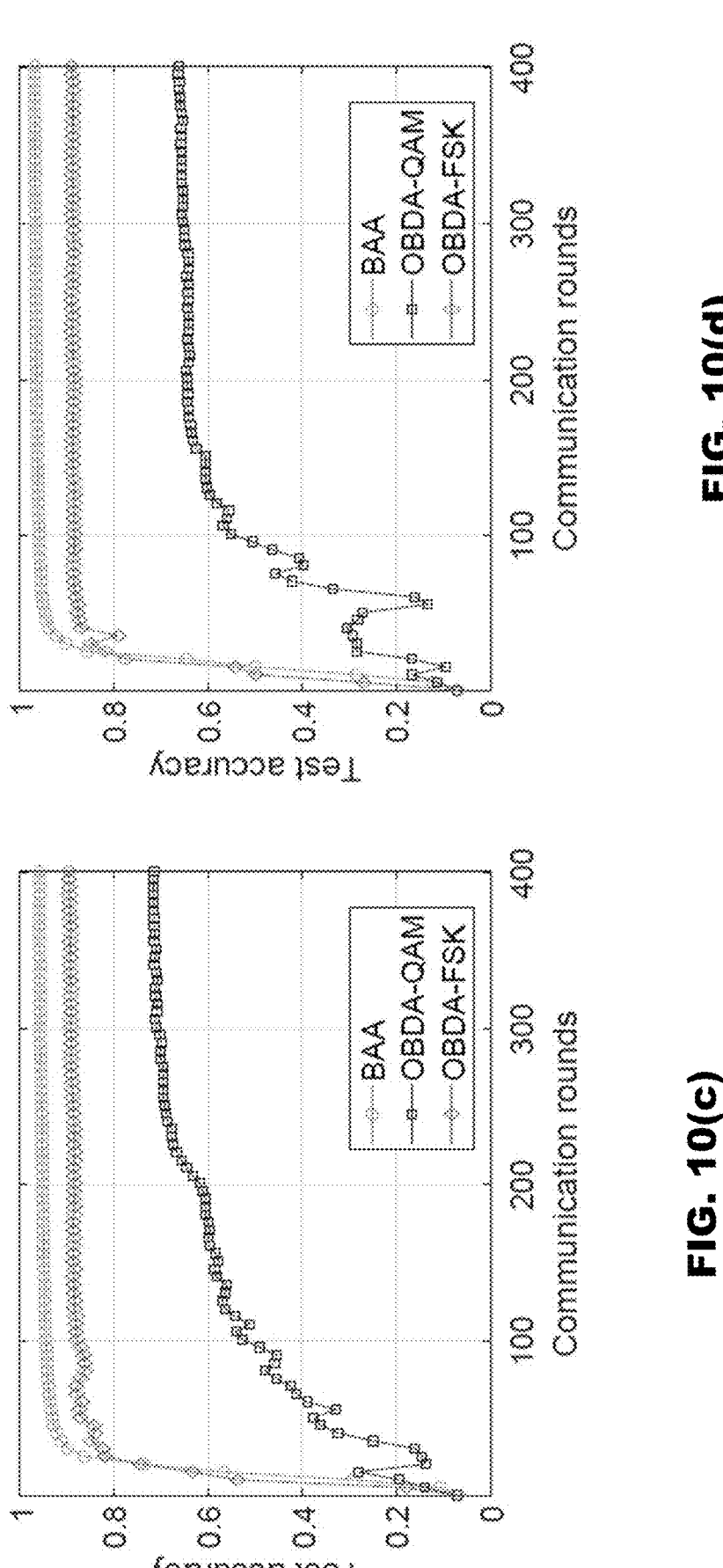
Figure 10F:
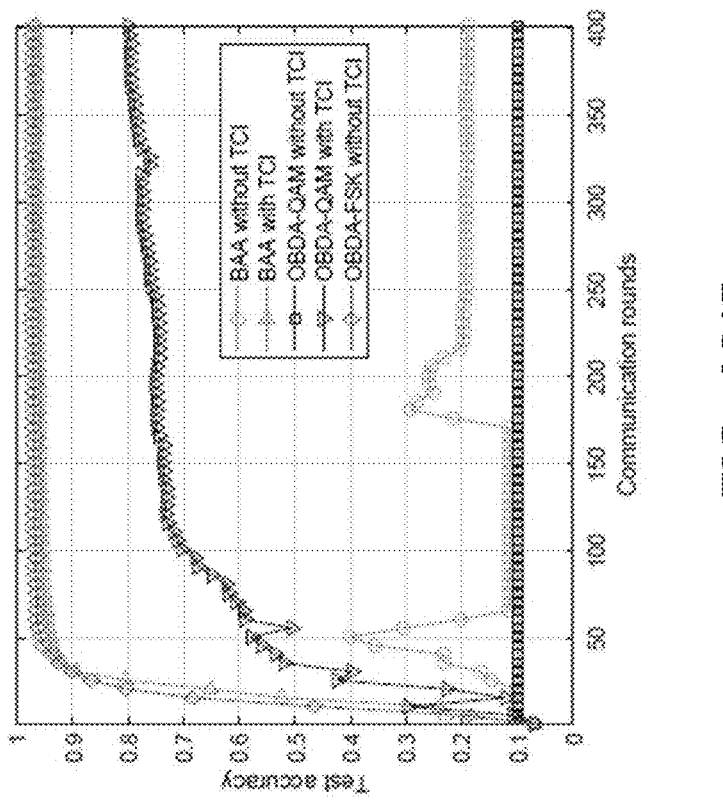
Figure 10E:
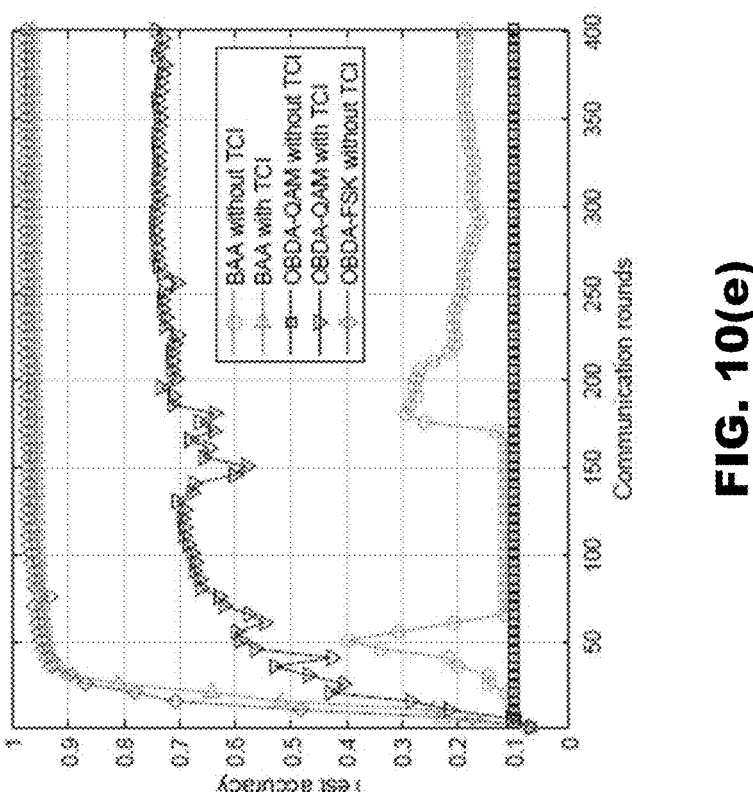
Figure 10H:
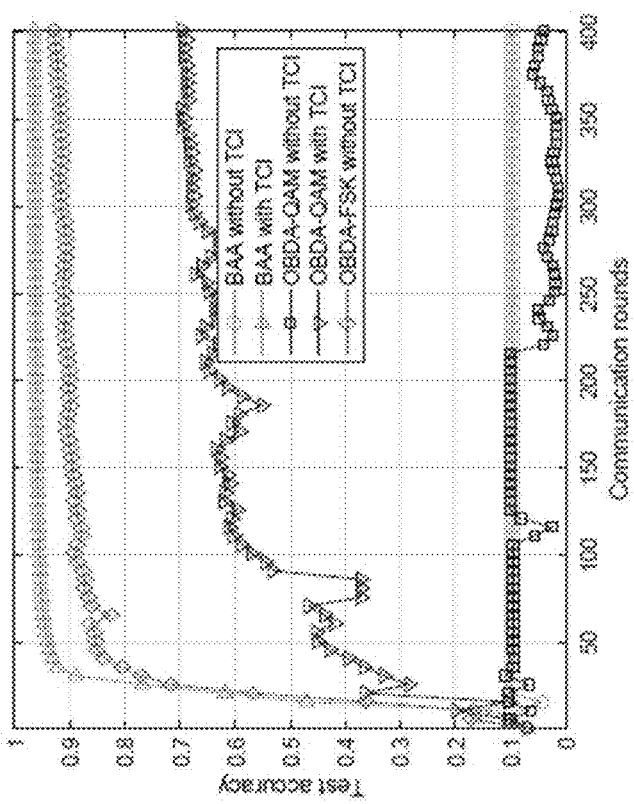
Figure 10H:
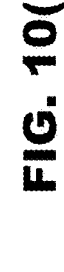
Figure 10G:
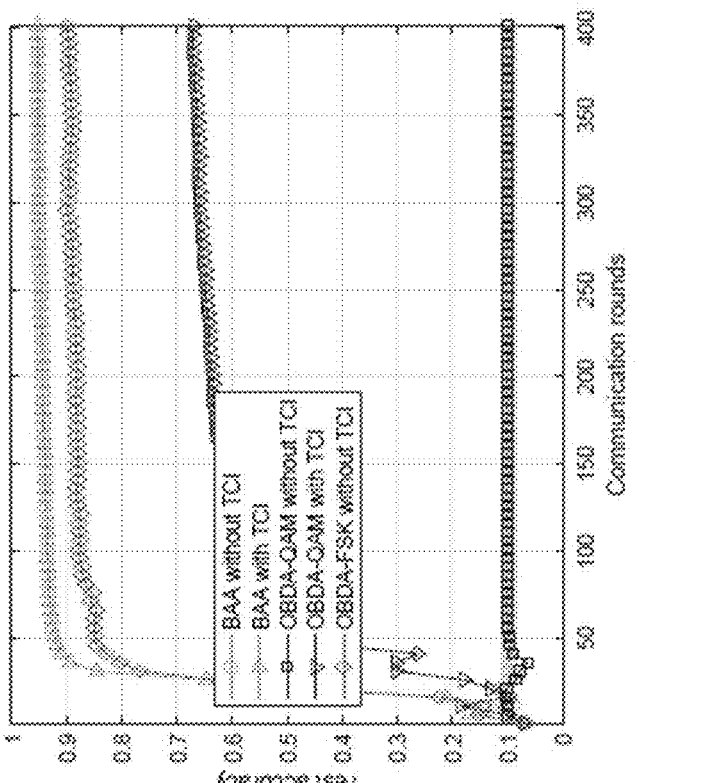

FIG. 7 is a schematic illustration of an exemplary presently disclosed embodiment (second aspect) of federated edge learning (FEEL) with one-bit broadband digital aggregation (OBDA) and frequency-shift keying (FSK) (OBDA-FSK) features. In FIG. 7, we provide the transmitter and receiver block diagrams for a FEEL system with OBDA-FSK. We also exemplify (re second aspect herewith) OBDA-FSK for K=3, q=5, M=10, and S=1 in FIG. 8. Assume that $$\tilde{g}_1^{(n)} = (1, 1, -1, -1, -1), \tilde{g}_2^{(n)} = (1, -1, 0, 0, 0), \text{ and}$$

$$\tilde{g}_3^{(n)} = (-1, 1, 1, -1, 0).$$

Therefore, based on (19) and (20), the symbols on the subcarriers can be calculated as $\sqrt{2}(s_{1.0}, 0, s_{1.1}, 0, 0, s_{1.2}, 0, s_{1.3}, 0, s_{1.4})$, $\sqrt{2}(s_{2.0}, 0, 0, s_{2.1}, 0, 0, 0, 0, 0, 0)$, and $\sqrt{2}(0, s_{3.0}, s_{3.1}, 0, 0, s_{3.3}, 0, 0, s_{3.3}, 0, 0)$ for the first ED, the second ED, and the third ED, respectively. After each ED's signal passes through their own multipath channels, the ES observes the superposed symbols on the same subcarrier indices. The detector at the ES then compares the energies on the two adjacent subcarriers to determine the gradient vector, i.e., $$v^{(n)} = \left(v_0^{(n)}, \ldots, v_4^{(n)}\right)$$

based on (23). For example, since the majority of the EDs (i.e., ED 1 and ED 2) activates the first subcarrier for i=0, it is likely that the detector returns $$v_0^{(n)} = 1$$

based on (21) and (22). In the case of a tie, e.g., $$v_2^{(n)},$$

the detector determines the MV as 0. Note that the energy on the subcarriers is unlikely to be identical in practice due to the noise, randomization symbols, and channel. Hence, we set the MV to 0 if the distance between $|r_{l_0,m_0}|^2$ and $|r_{l_1,m_1}|^2$ is less than t.

C. Trade-Offs and Comparisons

As opposed to other approaches[6]-[7], the proposed scheme does not need channel inversions at the EDs. From this aspect, it is compatible with time-varying channels (e.g., mobile networks[16]) and does not lose gradient information due to TCI. On the other hand, it quadruples the number of time-frequency resources for AirComp as compared to OBDAQAM[7]. OBDA-QAM is not investigated in terms of PMEPR in the literature. As shown in Section VIII, OBDAQAM can suffer from high PMEPR, while the proposed scheme reduces PMEPR with a simple randomization technique that also leads to more accurate results for non-IID data. As compared to some approaches[11]-[12], the proposed scheme also does not require CSI at the ES or multiple antennas.

VIII. Numerical Results of a Second Aspect

For the numerical results, we consider the learning task of handwritten-digit recognition with a FEEL system and compare the proposed scheme with BAA[6] for gradient averaging and OBDA-QAM[7]. We use MNIST dataset that contains 60,000 labelled handwritten-digit images size of 28×28 from 0 to 9. From the IID dataset, we randomly partition 20,000 training images into equal shares to $K \in \{10, 50\}$ EDs. For non-IID data set, we choose 5 digits for each ED and select the images randomly, i.e., different dataset can contain the same image. For a fair comparison, we use the same data randomization for different AirComp schemes. For the model, we consider a convolution neural network (CNN) that includes one 5×5 and two 3×3 convolutional layers, where each of them is followed by a batch normalization layer and rectified-linear unit (ReLU) activation follow each of them. All convolutional layers have 20 filters. After the third ReLU, a fully connected layer with 10 units and a softmax layer are utilized. At the input layer, no normalization is applied. Our model has $q=123,090$ learnable parameters, which corresponds to $S=206$, $S=103$ and $S=52$ OFDM symbols for the OBDA-FSK, BAA, and OBDA-QAM for $M=1200$, respectively. The subcarrier spacing is set to 15 kHz. For TCI, the truncation threshold is 0:2. We set t to be 0.01 for the proposed scheme. To test the FEEL, we consider two different uplink signal-to-noise ratios (SNRs), i.e., 0 dB and 20 dB. For the fading channel, we consider ITU Extended Pedestrian A (EPA) with no mobility and regenerate the channels between the ES and the EDs to capture the long-term channel variations for each communication round. For TCI, we assume that CSI is available at the EDs. For the update rule, we consider stochastic gradient descent with momentum, where the momentum is 0:9. The initial learning rate is 0:01 and the learning rate decays with by a rate of 0:05 for every communication round.

In FIG. 9, we provide the second aspect herewith test accuracy results for IID data. In AWGN channel, all AirComp schemes converge and return a high score for both 0 dB and 20 dB SNR for $K=10$ and $K=50$ EDs as shown in FIG. 9(a)-(d). The test accuracy with the BAA slowly converges as compared to the ones with the OBDA-QAM and the OBDA-FSK as the BAA is based on the actual values of the gradient estimates. In FIG. 9(e) and FIG. 9(f), we consider the fading channel for $K=50$ EDs. We observe that both BAA and OBDA-QAM fail when the TCI is not used at the EDs. On the other hand, the OBDAFSK offers high test accuracy without using TCI at the EDs or CSI at the ES. We observe similar behaviors for $K=10$ EDs in FIG. 9(g) and FIG. 9(h).

In FIG. 10, we provide second aspect herewith test accuracy results for the non-IID data. In AWGN channel, both BAA and OBDA-FSK are better than the OBDA-QAM, as shown in FIG. 10(a)-(d). Based on our tests, the superiority of the OBDA-FSK to the OBDAQAM is due to the randomization symbols that alter the MV. For example, although $\mathbb{E}[|T_{l_0,m_0}|^2] > \mathbb{E}[|r_{l_1,m_1}|^2]$ for $K_0 > K_1$, $|r_{l_1,m_1}|^2 + t$ can still occur as $r_{l_1}$ and $r_{l_1}$ are the summations of the randomization symbols. This random behavior may avoid converging a local optimum for non-IID data. In fading channel, the proposed scheme also works without TCI, as shown in FIG. 10(e)-(h), and the test accuracy converges faster than the one with OBDA-QAM.

Figure 11:
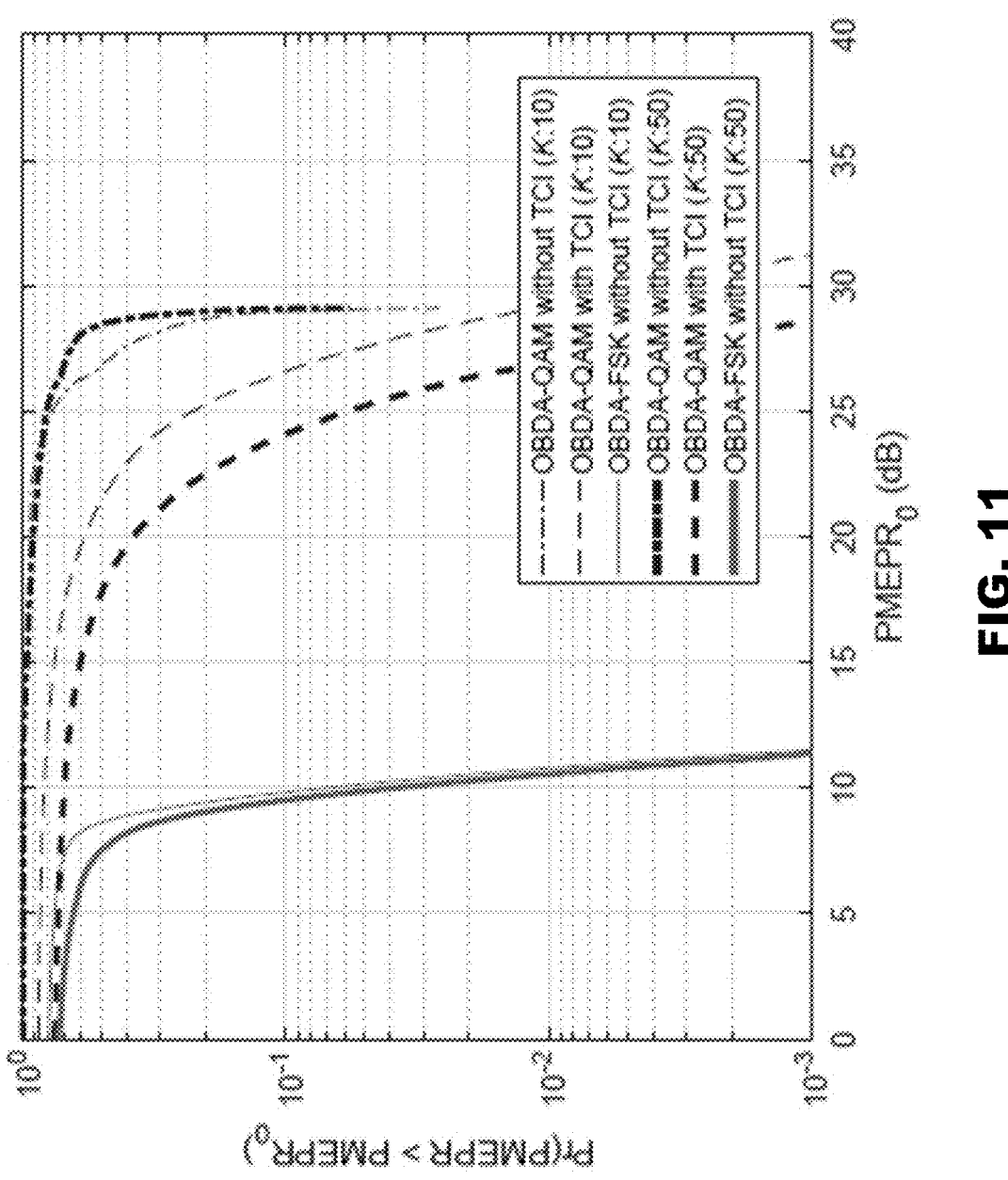
FIG. 11 graphically illustrates peak-to-mean envelope power ratio (PMEPR) distributions for the second aspect subject matter herewith, where the randomization symbols in OBDA-FSK lowers PMEPR.

In FIG. 11, we compare the PMEPR of the second aspect herewith digital aggregation schemes, i.e., OBDA-QAM and OBDA-FSK, for different numbers of EDs and the IID data in fading channel and 20 dB SNR. Since the proposed scheme introduces randomness in the frequency based on $S_{k,i}$ for $i=0; \ldots, q-1$, the proposed scheme exhibits a similar behavior to a typical OFDM transmission in terms of PMEPR. On the other hand, the OBDA-QAM with or without TCI causes substantially high PMEPR for OFDM as the signs of the gradient and the channel coefficients in the frequency domain are correlated.

IX. Concluding Remarks of a Second Aspect

In this disclosure, we propose an AirComp scheme for FEEL. The proposed scheme relies on MV and forms the options for voting on different subcarriers and/or OFDM symbols. Therefore, it allows the receiver to detect MV with a non-coherent detector and eliminates the need for TCI at the EDs. Therefore, it is compatible with time-varying channels. Also, we show that it can be used along with randomization methods in the frequency domain to reduce the PMEPR. Through simulations, we demonstrate that the proposed method provides high test accuracy in fading channel for both IID and non-IID data and it results in an acceptable PMEPR distribution at the expense of a larger number of time and frequency resources. The proposed method can be improved in various ways. For example, to lower PMEPR further, the randomization symbols can be designed based on the gradients. The precoded-OFDM, e.g., discrete Fourier transform (DFT)-spread OFDM, or various mapping strategies can also be explored to improve the proposed method. In this disclosure, we focus on one-bit quantitation. Extending the proposed concept to different quantization levels is another interesting research direction that can be pursued. The system-level analysis of the proposed method with heterogeneous data is also another direction that can be investigated.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal languages of the claims.

REFERENCES

[1] T. Gafni, N. Shlezinger, K. Cohen, Y. C. Eldar, and H. V. Poor, "Federated learning: A signal processing perspective," 2021. [Online]. Available: arXiv:2103.17150

[2] M. Chen, D. Gündüz, K. Huang, W. Saad, M. Bennis, A. V. Feljan, and H. V. Poor, "Distributed learning in wireless networks: Recent progress and future challenges," 2021. [Online]. Available: arXiv:2104.02151

[3] M. Goldenbaum, H. Boche, and S. Sta´ nczak, "Harnessing interference for analog function computation in wireless sensor networks," *IEEE Trans. Signal Process.*, vol. 61, no. 20, pp. 4893-4906, October 2013.

[4] W. Liu, X. Zang, Y. Li, and B. Vucetic, "Over-the-air computation systems: Optimization, analysis and scaling laws,"*IEEE Trans. Wireless Commun.*, vol. 19, no. 8, pp. 5488-5502, August 2020. [5] B. Nazer and M. Gastpar, "Computation over multiple-access channels," *IEEE Trans. Inf. Theory*, vol. 53, no. 10, pp. 3498-3516, October 2007.

[6] G. Zhu, Y. Wang, and K. Huang, "Broadband analog aggregation for low-latency federated edge learning," *IEEE Trans. Wireless Commun.*, vol. 19, no. 1, pp. 491-506, January 2020.

[7] G. Zhu, Y. Du, D. Gündüz, and K. Huang, "One-bit over-the-air aggregation for communication-efficient federated edge learning: Design and convergence analysis," *IEEE Trans. Wireless Commun.*, vol. 20, no. 3, pp. 2120-2135, November 2021.

[8] J. Bernstein, Y.-X. Wang, K. Azizzadenesheli, and A. Anandkumar, "signSGD: Compressed optimisation for non-convex problems," *in Proc. in International Conference on Machine Learning*, vol. 80. Proceedings of Machine Learning Research, 10-15 Jul. 2018, pp. 560-569.

[9] K. Yang, T. Jiang, Y. Shi, and Z. Ding, "Federated learning via over-the-air computation," *IEEE Trans. Wireless Commun.*, vol. 19, no. 3, pp. 2022-2035, 2020.

[10] M. M. Amiria, T. M. Duman, D. Gündüz, S. R. Kulkarni, and H. Vincent Poor, "Collaborative machine learning at the wireless edge with blind transmitters," *IEEE Trans. Wireless Commun.*, pp. 1-1, March 2021.

[11] A. Sahin, R. Yang, E. Bala, M. C. Beluri, and R. L. Olesen, "Flexible DFT-S-OFDM: Solutions and challenges," *IEEE Communications Magazine*, vol. 54, no. 11, pp. 106-112, 2016.

[12] A. Kakkavas, W. Xu, J. Luo, M. Castañeda, and J. A. Nossek, "On PAPR characteristics of DFT-s-OFDM with geometric and probabilistic constellation shaping," in *IEEE International Workshop on Signal Processing Advances in Wireless Communications (SPAWC)*, 2017, pp. 1-5.

[13] T. Sery, N. Shlezinger, K. Cohen, and Y. C. Eldar, "Over-the-air federated learning from heterogeneous data," 2020. [Online]. Available: arXiv:2009.12787

[14] M. M. Amiri and D. Gündüz, "Federated learning over wireless fading channels," *IEEE Trans. Wireless Commun.*, vol. 19, no. 5, pp. 3546-3557, February 2020.

[15] Y. A. Jawhar, L. Audah, M. A. Taher, K. N. Ramli, N. S. M. Shah, M. Musa, and M. S. Ahmed, "A review of partial transmit sequence for PAPR reduction in the OFDM systems," *IEEE Access*, vol. 7, pp. 18 021-18 041, 2019.

[16] T. Zeng, O. Semiari, M. Mozaffari, M. Chen, W. Saad, and M. Bennis, "Federated learning in the sky: Joint power allocation and scheduling with UAV swarms," in *Proc. IEEE International Conference on Communications (ICC)*, 2020, pp. 1-6.

What is claimed is:

1. An over-the-air computation (AirComp) methodology for federated edge learning (FEEL) without using channel state information (CSI) at a plurality of edge devices (EDs) or at an edge server (ES), comprising:

a distributed machine-learning model to be trained with the update vectors received at an edge server (ES) as transmitted from a plurality of edge devices (EDs);

one or more processors at the plurality of EDs and the ES; and one or more non-transitory computer-readable media that store instructions that, when executed by the one or more processors, cause the one or more processors to perform operations, the operations comprising:

at each respective ED, encoding local update vectors into votes by mapping voting options to separate orthogonal physical resources, the votes comprising (1) pulse-position modulation (PPM) symbols synthesized with discrete Fourier transform (DFT)-spread orthogonal frequency division multiplexing (OFDM) (DFT-s-OFDM) or (2) frequency-shift keying (FSK) symbols constructed with orthogonal frequency division multiplexing (OFDM), transmitting the encoded local update vectors as votes over selected multiple physical resources from each respective of the plurality of edge devices (EDs) via a wireless multiple access channel on common time-frequency resources, receiving the superposed local updates at the ES as a combined wireless signal, at the ES, determining the majority vote (MV) for each element of the update vector non-coherently with an energy detector by comparing energy levels across the orthogonal physical resources to resolve the MV without performing channel inversion at the plurality of EDs and without using channel state information (CSI) at the ES, and inputting the MVs into the machine-learning model to be updated.

2. An over-the-air computation (AirComp) methodology according to claim 1, wherein:

the votes are transmitted over multiple orthogonal sub-carriers, and the votes comprise pulse-position modulation (PPM) symbols constructed with discrete Fourier transform (DFT)-spread orthogonal frequency division multiplexing (OFDM) (DFT-s-OFDM); and determining the majority vote (MV) for each element of the update vector comprises aggregating operations which non-coherently compare energy levels using one-bit broadband digital aggregation (OBDA) and bins-based methodology.

3. An over-the-air computation (AirComp) methodology according to claim 2, wherein aggregating operations further include calculating the aggregated symbols on the bins as $$\tilde{d}_m = D_M^H M_f^H F_N r_m,$$

where $\tilde{d}_m \in \mathbb{C}^M$ are the received symbols on the bins.

4. An over-the-air computation (AirComp) methodology according to claim 2, wherein the receiving operations include the ES detecting MV with a non-coherent detector by taking the delay spread and synchronization errors into account to eliminate need for truncated-channel inversion (TCI) at the EDs.

5. An over-the-air computation (AirComp) methodology according to claim 2, wherein the machine learning model comprises artificial intelligence technology over wireless or sensor networks, 5G or higher, 6G wireless standardization, or IEEE 802.11 Wi-Fi.

6. An over-the-air computation (AirComp) methodology according to claim 2, wherein the transmitting local updates operation includes use of gradient averaging.

7. An over-the-air computation (AirComp) methodology according to claim 6, wherein the local gradient estimate $$estimatg_k^{(n)}$$

for the kth ED at the nth communication round between at least one ED and the ES comprises:

$$g_k^{(n)} = \frac{1}{D} \sum_{\forall \ell \in \mathcal{D}_k} \nabla f\!\left(w^{(n)}, x_\ell, y_\ell\right),$$

where $\nabla$ is the gradient operator and f (w(n), $x_l$, $y_l$) is the loss function quantifying the labeling error for the parameters w(n).

8. An over-the-air computation (AirComp) methodology according to claim 2, wherein the transmitting local updates operation includes use of signs of local gradients by the respective EDs with the estimate of the global gradient for the ith parameter calculated by using the MV principle as given by $$v_i^{(n)} \triangleq \mathrm{sign}\!\left(y_i^{(n)}\right),$$

where $$y_i^{(n)} = \sum_{k=1}^{K} \tilde{g}_{k,i}^{(n)}.$$

9. An over-the-air computation (AirComp) methodology according to claim 2, wherein the machine-learning model is training to learn the task of handwritten digit recognition.

10. An over-the-air computation (AirComp) methodology according to claim 2, wherein the machine-learning model comprises a convolution neural network with multiple convolutional layers, with each convolutional layer followed by a batch normalization layer and rectified-linear unit (ReLU) activation following each of them.

11. An over-the-air computation (AirComp) methodology according to claim 10, wherein the multiple convolutional layers each have a plurality of filters, and a fully connected layer with plural units and a softmax layer are used after one of the ReLU.

12. An over-the-air computation (AirComp) methodology according to claim 1, wherein:

the votes are transmitted over multiple orthogonal subcarriers, and the votes comprise frequency-shift keying (FSK) symbols constructed with orthogonal frequency division multiplexing (OFDM) for voting options; and determining the majority vote (MV) for each element of the update vector comprises aggregating operations which non-coherently compare energy levels using one-bit broadband digital aggregation (OBDA) and frequency-shift keying (FSK)-based methodology.

13. An over-the-air computation (AirComp) methodology according to claim 12, further comprising operations using randomization symbols on active subcarriers to reduce peak-to-mean envelope power ratio (PMEPR).

14. An over-the-air computation (AirComp) methodology according to claim 12, wherein the receiving operations include the ES detecting MV with a non-coherent detector.

15. An over-the-air computation (AirComp) methodology according to claim 12, wherein the machine learning model comprises artificial intelligence technology over wireless or sensor networks, 5G or higher, 6G wireless standardization, or IEEE 802.11 Wi-Fi.

16. An over-the-air computation (AirComp) methodology according to claim 12, wherein the transmitting local updates operation includes use of gradient averaging.

17. An over-the-air computation (AirComp) methodology according to claim 16, wherein the local gradient estimate $$estimatg_k^{(n)}$$

for the kth ED at the nth communication round between at least one ED and the ES comprises:

$$g_k^{(n)} = VF_k\!\left(w^{(n)}\right) = \frac{1}{D} \sum_{\forall \ell \in D_k} Vf\!\left(w^{(n)}, X_\ell, y_\ell\right)$$

where $\nabla$ represents the gradient operator, and f (w(n), $x_l$, $y_l$) is the loss function quantifying the labeling error for the parameters w(n).

18. An over-the-air computation (AirComp) methodology according to claim 17, further comprising global gradient operations that the ES determines and distributes a global gradient estimate to the EDs and the current machine-learning model is updated based on a common update rule, and the global gradient operations are repeated consecutively until a predetermined convergence criterion is achieved.

19. An over-the-air computation (AirComp) methodology according to claim 12, wherein the transmitting local updates operation includes use of signs of local gradients by the respective EDs with the estimate of the global gradient for the ith parameter calculated by using the MV principle as given by $$v_i^{(n)} \triangleq \mathrm{sign}\!\left(y_i^{(n)}\right),$$

where $$y_i^{(n)} = \sum_{k=1}^{K} \tilde{g}_{k,i}^{(n)}.$$

20. An over-the-air computation (AirComp) methodology according to claim 12, further comprising operations, after a signal passes from each ED through their own multipath channels, the ES observes the superposed symbols on the same subcarrier indices.

21. An over-the-air computation (AirComp) methodology according to claim 20, further comprising detector operations at the ES that the detector compares the energies on two adjacent subcarriers to determine the gradient vector.

22. An over-the-air computation (AirComp) methodology according to claim 12, wherein the machine-learning model is training to learn the task of handwritten-digit recognition.

23. An over-the-air computation (AirComp) methodology according to claim 12, wherein the machine-learning model comprises a convolution neural network with multiple convolutional layers, with each convolutional layer followed by a batch normalization layer and rectified-linear unit (ReLU) activation following each of them.

24. An over-the-air computation (AirComp) methodology according to claim 23, wherein the multiple convolutional layers each have a plurality of filters, and a fully connected layer with plural units and a softmax layer are used after one of the ReLU.

25. An over-the-air computation (AirComp) system for federated edge learning (FEEL) without using channel state information (CSI) at a plurality of edge devices (EDs) or at an edge server (ES), comprising:

a machine-learning model training to process data received at an edge server (ES) as transmitted from a plurality of edge devices (EDs);

one or more processors at the plurality of EDs and the ES; and one or more non-transitory computer-readable media that store instructions that, when executed by the one or more processors, cause the one or more processors to perform operations, the operations comprising:

at each respective ED, encoding local update vectors into votes by mapping voting options to separate orthogonal physical resources, the votes comprising (1) pulse-position modulation (PPM) symbols synthesized with discrete Fourier transform (DFT)-spread orthogonal frequency division multiplexing (OFDM) (DFT-s-OFDM) or (2) frequency-shift keying (FSK) symbols constructed with orthogonal frequency division multiplexing (OFDM), transmitting the encoded local updates as votes over selected multiple physical resources from each respective of the plurality of edge devices (EDs) via a wireless multiple access channel on common time-frequency resources, receiving the superposed local updates at the ES as a combined wireless signal, aggregating the local updates at the ES non-coherently including separating votes from the EDs by comparing energy levels across the orthogonal physical resources to resolve a majority vote (MV) without performing channel inversion at the plurality of EDs and without using channel state information (CSI) at the ES, and inputting the obtained data into the machine-learning model as training data or data to process.

26. An over-the-air computation (AirComp) system according to claim 25, further including transmitters for transmitting the votes over multiple orthogonal subcarriers; and wherein, to determine the majority vote (MV) for each element of the local updates, the one or more processors are further programmed to perform aggregating operations which non-coherently compare energy levels using one-bit broadband digital aggregation (OBDA) and bins-based methodology.

27. An over-the-air computation (AirComp) system according to claim 26, wherein, to perform aggregating operations, the one or more processors are further programmed to calculate the aggregated symbols on the bins as $$\tilde{d}_m = D_M^H M_f^H F_N r_m,$$

where $\tilde{d}_m \in C^M$ are the received symbols on the bins.

28. An over-the-air computation (AirComp) system according to claim 25, wherein, to perform receiving operations, the one or more processors are further programmed to include the ES detecting MV with a non-coherent detector by taking the delay spread and synchronization errors into account to eliminate need for truncated-channel inversion (TCI) at the EDs.

29. An over-the-air computation (AirComp) system according to claim 25, wherein the transmitting local updates operation includes use of either gradient averaging or use of signs of local gradients by the respective EDs.

30. An over-the-air computation (AirComp) system according to claim 25, wherein the machine-learning model comprises a convolution neural network with multiple convolutional layers, with each convolutional layer followed by a batch normalization layer and rectified-linear unit (ReLU) activation following each of them.

31. An over-the-air computation (AirComp) system for federated edge learning (FEEL) without using channel state information (CSI) at a plurality of edge devices (EDs) or at an edge server (ES), comprising:

a machine-learning model training to process data received at an edge server (ES) as transmitted from a plurality of edge devices (EDs);

one or more processors at the plurality of EDs and the ES; and one or more non-transitory computer-readable media that store instructions that, when executed by the one or more processors, cause the one or more processors to perform operations, the operations comprising:

at each respective ED, encoding local updates into votes by mapping voting options to separate orthogonal physical resources, wherein the votes comprise frequency-shift keying (FSK) symbols constructed with orthogonal frequency division multiplexing (OFDM) for voting options, transmitting the encoded local updates as votes over the orthogonal physical resources from each respective of the plurality of edge devices (EDs) via a wireless multiple access channel on common time-frequency resources, receiving the superposed local updates at the ES as a combined wireless signal, aggregating the local updates at the ES non-coherently including separating votes from the EDs by comparing energy levels across the orthogonal physical resources to resolve a majority vote (MV) principle without performing channel inversion at the plurality of EDs and without using channel state information (CSI) at the ES, and inputting the obtained data into the machine-learning model as training data or data to process.

32. An over-the-air computation (AirComp) system according to claim 31, further including transmitters for transmitting the votes over multiple orthogonal subcarriers; and wherein, to determine the majority vote (MV) for each element of the local updates, the one or more processors are further programmed to perform aggregating operations which non-coherently compare energy levels using one-bit broadband digital aggregation (OBDA) and frequency-shift keying (FSK)-based methodology.

33. An over-the-air computation (AirComp) system according to claim 31, wherein, to receive the local updates at the ES, the one or more processors are further programmed to include the ES detecting MV with a non-coherent detector.

34. An over-the-air computation (AirComp) system according to claim 31, wherein, to transmit the local updates, the one or more processors are further programmed to include use of either gradient averaging or use of signs of local gradients by the respective EDs.

35. An over-the-air computation (AirComp) system according to claim 31, the one or more processors are further programmed to conduct global gradient operations comprising that the ES determines and distributes a global gradient estimate to the EDs and the current machine-learning model is updated based on a common update rule, and the global gradient operations are repeated consecutively until a predetermined convergence criterion is achieved.

36. An over-the-air computation (AirComp) system according to claim 31, wherein the machine-learning model comprises a convolution neural network with multiple convolutional layers, with each convolutional layer followed by a batch normalization layer and rectified-linear unit (ReLU) activation following each of them.

\* \* \* \* \*